(12) United States Patent
Kuzuhara et al.

(10) Patent No.: US 9,110,231 B2
(45) Date of Patent: Aug. 18, 2015

(54) INNER FOCUS LENS SYSTEM, INTERCHANGEABLE LENS APPARATUS AND CAMERA SYSTEM

(71) Applicant: Panasonic Corporation, Kadoma-shi, Osaka (JP)

(72) Inventors: Satoshi Kuzuhara, Hyogo (JP); Yoshio Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/107,595

(22) Filed: Dec. 16, 2013

(65) Prior Publication Data

US 2014/0184882 A1 Jul. 3, 2014

(30) Foreign Application Priority Data

Dec. 27, 2012 (JP) ................. 2012-284197
Oct. 28, 2013 (JP) ................. 2013-223372

(51) Int. Cl.
*G02B 15/14* (2006.01)
*G02B 9/12* (2006.01)
*G02B 15/177* (2006.01)

(52) U.S. Cl.
CPC .............. *G02B 9/12* (2013.01); *G02B 15/177* (2013.01)

(58) Field of Classification Search
USPC ....................................... 359/684
See application file for complete search history.

(56) References Cited

U.S. PATENT DOCUMENTS

2005/0141100 A1* 6/2005 Kojima et al. ................ 359/680
2014/0184887 A1* 7/2014 Yonetani et al. ............. 348/349

FOREIGN PATENT DOCUMENTS

| JP | 2000-214386 A | 8/2000 |
| JP | 2003-329930 A | 11/2003 |
| JP | 2011-064919 A | 3/2011 |
| JP | 2011-076022 A | 4/2011 |
| JP | 2012-103375 A | 5/2012 |
| JP | 2012-173435 A | 9/2012 |
| WO | WO-2010-119640 A1 | 10/2010 |

* cited by examiner

*Primary Examiner* — James Jones
(74) *Attorney, Agent, or Firm* — James W. Judge

(57) ABSTRACT

An inner focus lens system, in order from an object side, comprising: a first lens unit including a most-object-side negative first lens element; a positive second lens unit; and a negative third lens unit, wherein an aperture diaphragm is included, the first lens unit, the third lens unit, and the aperture diaphragm are fixed relative to an image surface in focusing, the second lens unit moves relative to the image surface in the focusing, and the conditions: BF/Y<1.7 and TH/f>1.6 (BF: a distance from an apex of an image-side surface of a most-image-side lens element to the image surface, Y: a maximum image height, TH: a distance from an apex of an object-side surface of a most-object-side lens element to the apex of the image-side surface of the most-image-side lens element, f: a focal length of the lens system) are satisfied.

14 Claims, 12 Drawing Sheets

INNER FOCUS LENS SYSTEM, INTERCHANGEABLE LENS APPARATUS AND CAMERA SYSTEM

CROSS-REFERENCE TO RELATED APPLICATION

This application is based on application No. 2012-284197 filed in Japan on Dec. 27, 2012 and application No. 2013-223372 filed in Japan on Oct. 28, 2013, the contents of which are hereby incorporated by reference.

BACKGROUND

1. Field

The present disclosure relates to inner focus lens systems, interchangeable lens apparatuses and camera systems.

2. Description of the Related Art

Interchangeable lens apparatuses, camera systems, and the like, each including an image sensor for performing photoelectric conversion, are strongly required to realize size reduction and performance improvement. Various kinds of lens systems used in such interchangeable lens apparatuses and camera systems have been proposed.

Japanese Laid-Open Patent Publication No. 2011-076022 discloses a rear focus type inner focus lens having a shortened back focal length, which is composed of, in order from the object side, a first lens unit having positive refractive power, and a second lens unit having positive refractive power.

Japanese Laid-Open Patent Publication No. 2011-064919 discloses an inner focus lens which is composed of, in order from the object side, a first lens unit having negative refractive power, a second lens unit having positive refractive power, a third lens unit having positive refractive power, and a fourth lens unit having negative refractive power. In the inner focus lens, focusing is performed by the second lens unit and the third lens unit.

SUMMARY

The present disclosure provides an inner focus lens system having a large aperture, and yet having excellent performance and compact size. Further, the present disclosure provides an interchangeable lens apparatus including the inner focus lens system, and a camera system including the interchangeable lens apparatus.

The novel concepts disclosed herein were achieved in order to solve the foregoing problems in the related art, and herein is disclosed:

an inner focus lens system having a plurality of lens units each being composed of at least one lens element, the inner focus lens system, in order from an object side to an image side, comprising:

a first lens unit including a first lens element that is located closest to the object side, and has negative optical power;

a second lens unit having positive optical power; and a third lens unit having negative optical power, wherein an aperture diaphragm is provided, the first lens unit, the third lens unit, and the aperture diaphragm are fixed with respect to an image surface in focusing from an infinity in-focus condition to a close-object in-focus condition, the second lens unit moves with respect to the image surface in the focusing, and the following conditions (1) and (2) are satisfied:

$$BF/Y < 1.7 \tag{1}$$

$$TH/f > 1.6 \tag{2}$$

where

BF is a distance from an apex of an image side surface of a lens element located closest to the image side in the lens system, to the image surface, Y is a maximum image height, TH is a distance from an apex of an object side surface of a lens element located closest to the object side in the lens system, to the apex of the image side surface of the lens element located closest to the image side in the lens system, and f is a focal length of the lens system in an infinity in-focus condition.

The novel concepts disclosed herein were achieved in order to solve the foregoing problems in the related art, and herein is disclosed:

an interchangeable lens apparatus comprising:

an inner focus lens system; and a lens mount section which is connectable to a camera body including an image sensor for receiving an optical image formed by the inner focus lens system and converting the optical image into an electric image signal, wherein the inner focus lens system is an inner focus lens system having a plurality of lens units each being composed of at least one lens element, the inner focus lens system, in order from an object side to an image side, comprising:

a first lens unit including a first lens element that is located closest to the object side, and has negative optical power;

a second lens unit having positive optical power; and a third lens unit having negative optical power, wherein an aperture diaphragm is provided, the first lens unit, the third lens unit, and the aperture diaphragm are fixed with respect to an image surface in focusing from an infinity in-focus condition to a close-object in-focus condition, the second lens unit moves with respect to the image surface in the focusing, and the following conditions (1) and (2) are satisfied:

$$BF/Y < 1.7 \tag{1}$$

$$TH/f > 1.6 \tag{2}$$

where

BF is a distance from an apex of an image side surface of a lens element located closest to the image side in the lens system, to the image surface, Y is a maximum image height, TH is a distance from an apex of an object side surface of a lens element located closest to the object side in the lens system, to the apex of the image side surface of the lens element located closest to the image side in the lens system, and f is a focal length of the lens system in an infinity in-focus condition.

The novel concepts disclosed herein were achieved in order to solve the foregoing problems in the related art, and herein is disclosed:

a camera system comprising:

an interchangeable lens apparatus including an inner focus lens system; and a camera body which is detachably connected to the interchangeable lens apparatus via a camera mount section, and includes an image sensor for receiving an optical image formed by the inner focus lens system and converting the optical image into an electric image signal, wherein the inner focus lens system is an inner focus lens system having a plurality of lens units each being composed of at least one lens element, the inner focus lens system, in order from an object side to an image side, comprising:

a first lens unit including a first lens element that is located closest to the object side, and has negative optical power;

a second lens unit having positive optical power; and a third lens unit having negative optical power, wherein an aperture diaphragm is provided, the first lens unit, the third lens unit, and the aperture diaphragm are fixed with respect to an image surface in focusing from an infinity in-focus condition to a close-object in-focus condition, the second lens unit moves with respect to the image surface in the focusing, and the following conditions (1) and (2) are satisfied:

$$BF/Y < 1.7 \quad (1)$$

$$TH/f > 1.6 \quad (2)$$

where

BF is a distance from an apex of an image side surface of a lens element located closest to the image side in the lens system, to the image surface, Y is a maximum image height, TH is a distance from an apex of an object side surface of a lens element located closest to the object side in the lens system, to the apex of the image side surface of the lens element located closest to the image side in the lens system, and f is a focal length of the lens system in an infinity in-focus condition.

The inner focus lens system according to the present disclosure has a large aperture, and yet has excellent performance and compact size.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 9

FIGS. 1, 3, 5, 8, 10, 13, 15, 17, and 19 are lens arrangement diagrams showing infinity in-focus conditions of inner focus lens systems according to Embodiments 1 to 9, respectively.

Each of the inner focus lens systems according to Embodiments 1 to 8, in order from the object side to the image side, comprises a first lens unit G1 having positive optical power, a second lens unit G2 having positive optical power, and a third lens unit G3 having negative optical power. In each of the inner focus lens systems according to Embodiments 1 to 8, an aperture diaphragm A is provided on the object side relative to the second lens unit G2. The inner focus lens system according to Embodiment 9, in order from the object side to the image side, comprises a first lens unit G1 having negative optical power, a second lens unit G2 having positive optical power, and a third lens unit G3 having negative optical power. In the inner focus lens system according to Embodiment 9, an aperture diaphragm A is provided on the object side relative to the second lens unit G2.

In each Fig., an arrow imparted to a lens unit indicates focusing from an infinity in-focus condition to a close-object in-focus condition. That is, the arrow indicates a direction in which the second lens unit G2 moves in focusing from an infinity in-focus condition to a close-object in-focus condition. In the focusing, the first lens unit G1, the third lens unit G3, and the aperture diaphragm A do not move.

In each Fig., an asterisk "*" imparted to a particular surface indicates that the surface is aspheric. Further, in each Fig., a symbol (+) or (−) imparted to the symbol of each lens unit corresponds to the sign of the optical power of the lens unit. Still further, in each Fig., a straight line located on the most right-hand side indicates the position of an image surface S.

Figure 5:
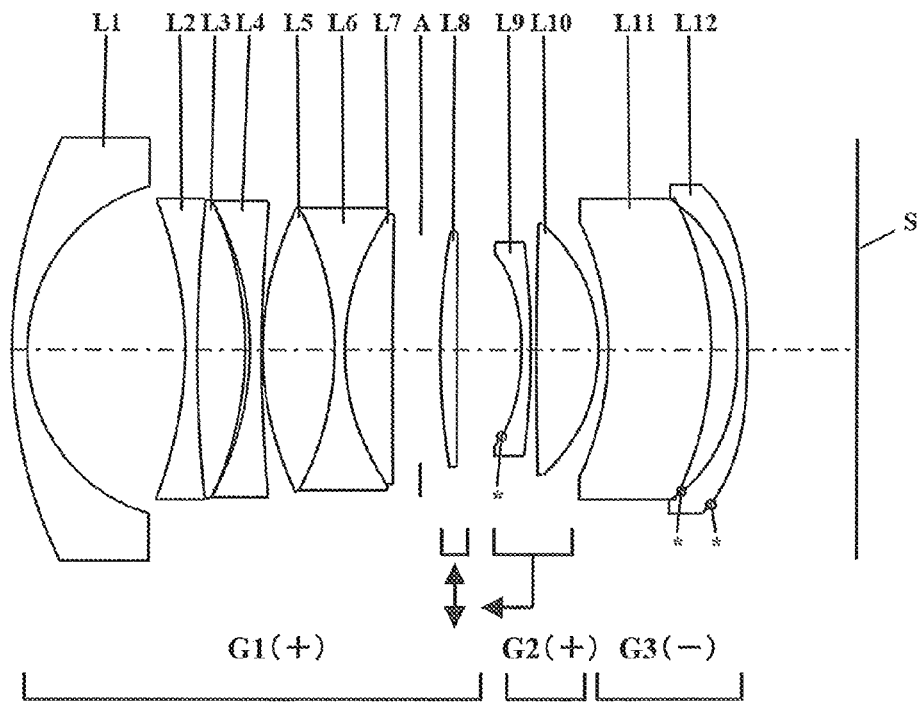
FIG. 5 is a lens arrangement diagram showing an infinity in-focus condition of an inner focus lens system according to Embodiment 3 (Numerical Example 3)
Figure 6:
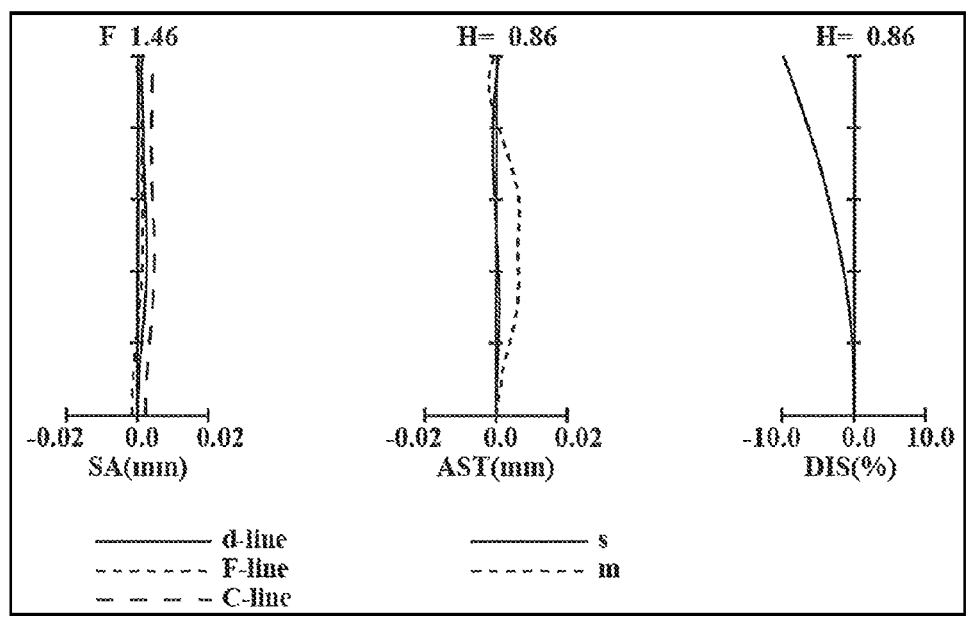
FIG. 6 is a longitudinal aberration diagram of the infinity in-focus condition of the inner focus lens system according to Numerical Example 3.
Figure 10:
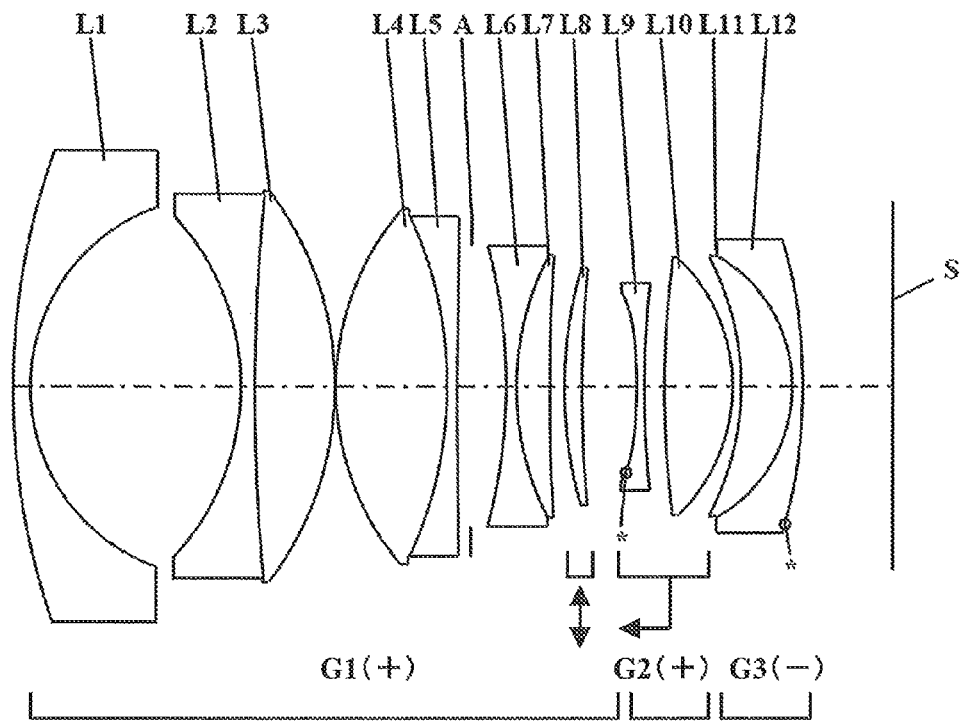
FIG. 10 is a lens arrangement diagram showing an infinity in-focus condition of an inner focus lens system according to Embodiment 5 (Numerical Example 5)
Figure 11:
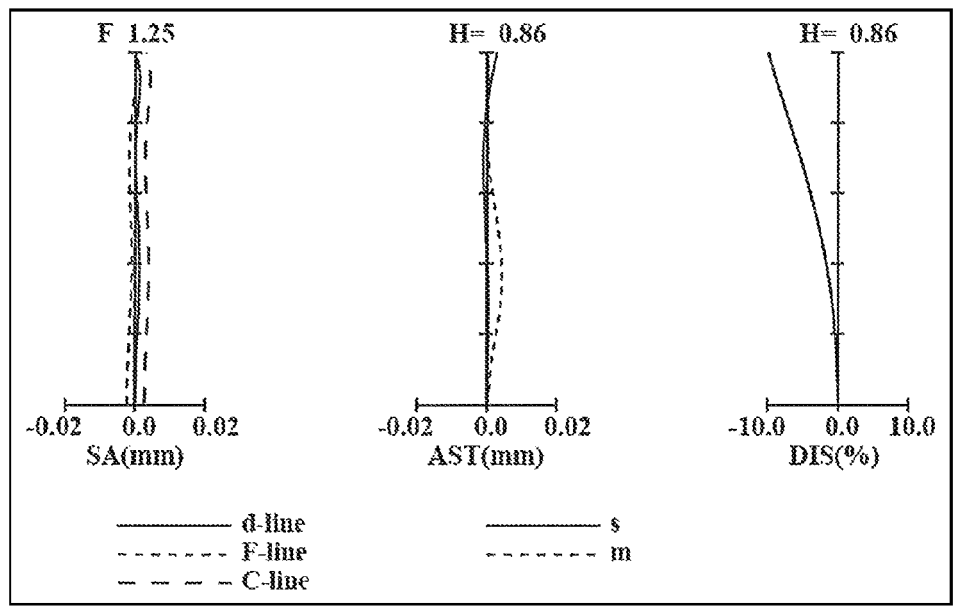
FIG. 11 is a longitudinal aberration diagram of the infinity in-focus condition of the inner focus lens system according to Numerical Example 5.

In FIGS. 5 and 10, a double-headed arrow imparted to an eighth lens element L8 indicates a direction (a direction perpendicular to the optical axis) in which the eighth lens element L8 moves when image point movement caused by vibration of the entire system is compensated.

Embodiment 1

Figure 1:
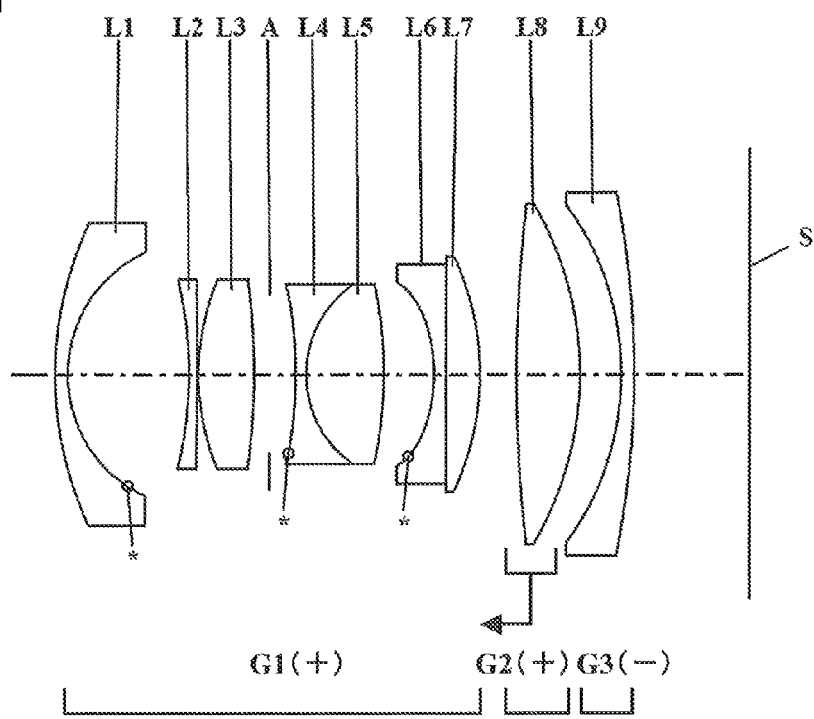
FIG. 1 is a lens arrangement diagram showing an infinity in-focus condition of an inner focus lens system according to Embodiment 1 (Numerical Example 1)
Figure 2:
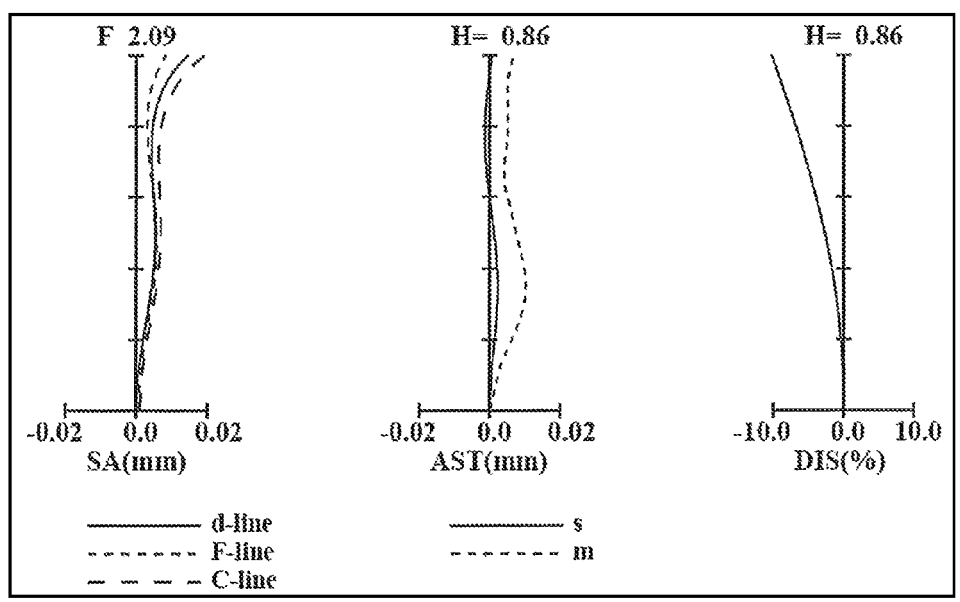
FIG. 2 is a longitudinal aberration diagram of the infinity in-focus condition of the inner focus lens system according to Numerical Example 1.

As shown in FIG. 1, the first lens unit G1, in order from the object side to the image side, comprises: a negative meniscus first lens element L1 with the convex surface facing the object side; a negative meniscus second lens element L2 with the convex surface facing the image side; a bi-convex third lens element L3; an aperture diaphragm A; a bi-concave fourth lens element L4; a bi-convex fifth lens element L5; a bi-concave sixth lens element L6; and a bi-convex seventh lens element L7. Among these, the fourth lens element L4 and the fifth lens element L5 are cemented with each other, and the sixth lens element L6 and the seventh lens element L7 are cemented with each other. Further, the first lens element L1 has an aspheric image side surface, the fourth lens element L4 has an aspheric object side surface, and the sixth lens element L6 has an aspheric object side surface.

The second lens unit G2 comprises solely a bi-convex eighth lens element L8. Focusing from an infinity in-focus condition to a close-object in-focus condition is performed by moving the second lens unit G2 to the object side along the optical axis.

The third lens unit G3 comprises solely a negative meniscus ninth lens element L9 with the convex surface facing the image side.

Embodiment 2

Figure 3:
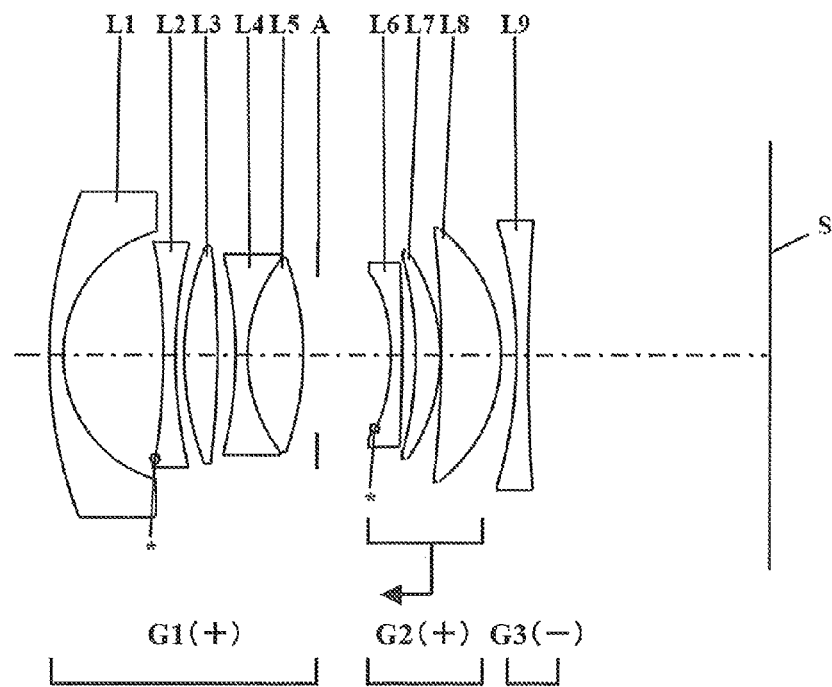
FIG. 3 is a lens arrangement diagram showing an infinity in-focus condition of an inner focus lens system according to Embodiment 2 (Numerical Example 2)
Figure 4:
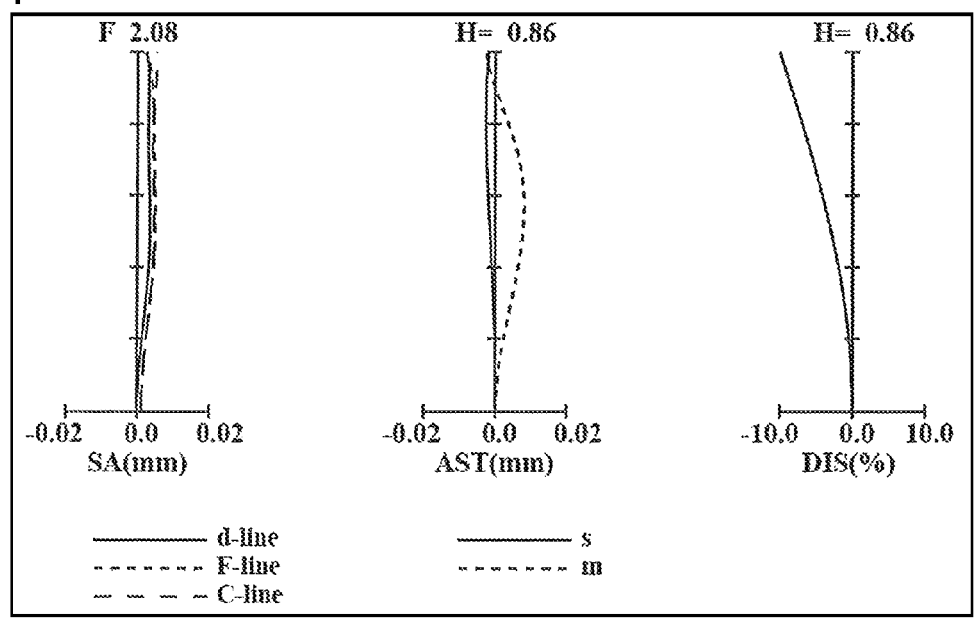
FIG. 4 is a longitudinal aberration diagram of the infinity in-focus condition of the inner focus lens system according to Numerical Example 2.

As shown in FIG. 3, the first lens unit G1, in order from the object side to the image side, comprises: a negative meniscus first lens element L1 with the convex surface facing the object side; a bi-concave second lens element L2; a bi-convex third lens element L3; a bi-concave fourth lens element L4; a bi-convex fifth lens element L5; and an aperture diaphragm A. Among these, the fourth lens element L4 and the fifth lens element L5 are cemented with each other. Further, the second lens element L2 has an aspheric object side surface.

The second lens unit G2, in order from the object side to the image side, comprises: a negative meniscus sixth lens element L6 with the convex surface facing the image side; a positive meniscus seventh lens element L7 with the convex surface facing the image side; and a positive meniscus eighth lens element L8 with the convex surface facing the image side. Among these, the sixth lens element L6 has an aspheric object side surface. Focusing from an infinity in-focus condition to a close-object in-focus condition is performed by moving the second lens unit G2 to the object side along the optical axis.

The third lens unit G3 comprises solely a bi-concave ninth lens element L9.

Embodiment 3

As shown in FIG. 5, the first lens unit G1, in order from the object side to the image side, comprises: a negative meniscus first lens element L1 with the convex surface facing the object side; a bi-concave second lens element L2; a bi-convex third lens element L3; a bi-concave fourth lens element L4; a bi-convex fifth lens element L5; a bi-concave sixth lens element L6; a positive meniscus seventh lens element L7 with the convex surface facing the object side; an aperture diaphragm A; and a positive meniscus eighth lens element L8 with the convex surface facing the object side. Among these, the second lens element L2 and the third lens element L3 are cemented with each other, and the fifth lens element L5, the sixth lens element L6, and the seventh lens element L7 are cemented with each other. Further, by moving the eighth lens element L8 as a single lens element having positive optical power in a direction perpendicular to the optical axis, image point movement caused by vibration of the entire system can be compensated. That is, image blur caused by hand blurring, vibration and the like can be compensated optically.

The second lens unit G2, in order from the object side to the image side, comprises: a negative meniscus ninth lens element L9 with the convex surface facing the image side; and a bi-convex tenth lens element L10. Among these, the ninth lens element L9 has an aspheric object side surface. Focusing from an infinity in-focus condition to a close-object in-focus condition is performed by moving the second lens unit G2 to the object side along the optical axis.

The third lens unit G3, in order from the object side to the image side, comprises: a negative meniscus eleventh lens element L11 with the convex surface facing the image side; and a negative meniscus twelfth lens element L12 with the convex surface facing the image side. Among these, the twelfth lens element L12 has two aspheric surfaces.

Embodiment 4

Figure 8:
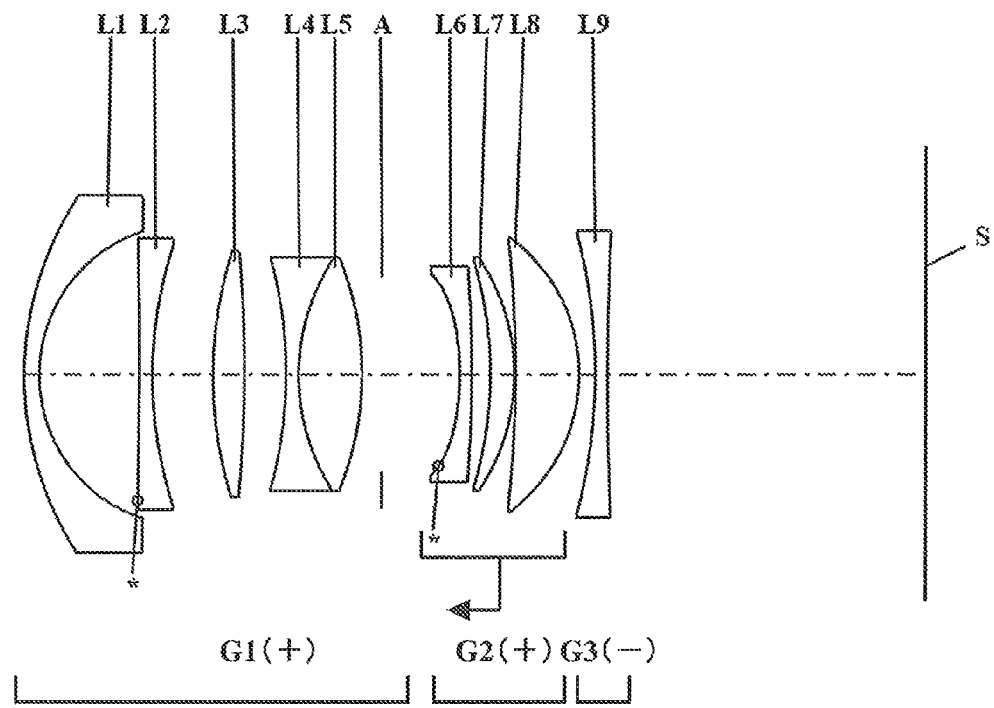
FIG. 8 is a lens arrangement diagram showing an infinity in-focus condition of an inner focus lens system according to Embodiment 4 (Numerical Example 4)
Figure 9:
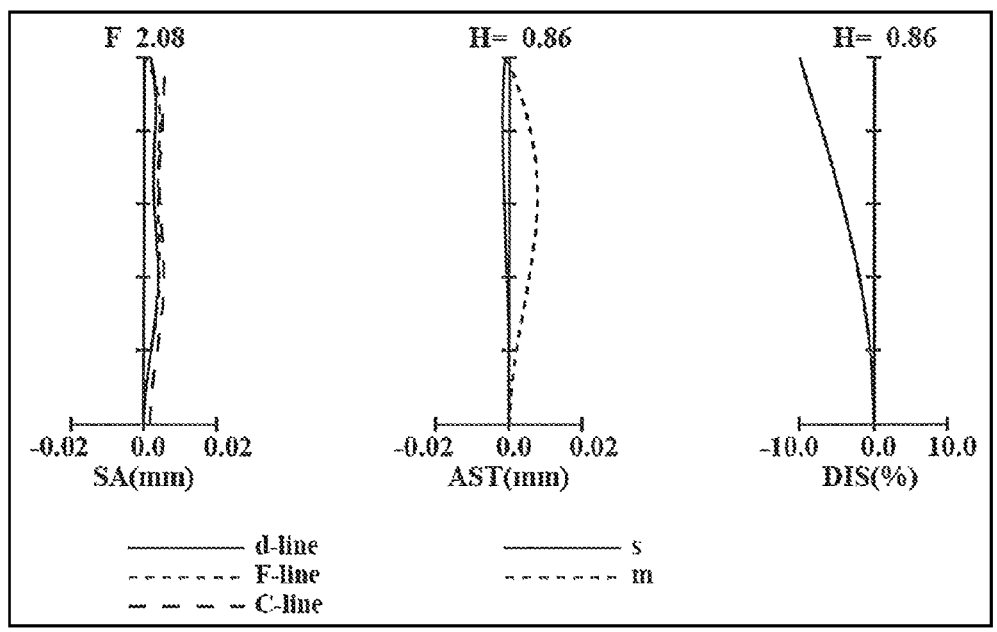
FIG. 9 is a longitudinal aberration diagram of the infinity in-focus condition of the inner focus lens system according to Numerical Example 4.

As shown in FIG. 8, the first lens unit G1, in order from the object side to the image side, comprises: a negative meniscus first lens element L1 with the convex surface facing the object side; a bi-concave second lens element L2; a bi-convex third lens element L3; a bi-concave fourth lens element L4; a bi-convex fifth lens element L5; and an aperture diaphragm A. Among these, the fourth lens element L4 and the fifth lens element L5 are cemented with each other. Further, the second lens element L2 has an aspheric object side surface.

The second lens unit G2, in order from the object side to the image side, comprises: a negative meniscus sixth lens element L6 with the convex surface facing the image side; a positive meniscus seventh lens element L7 with the convex surface facing the image side; and a positive meniscus eighth lens element L8 with the convex surface facing the image side. Among these, the sixth lens element L6 has an aspheric object side surface. Focusing from an infinity in-focus condition to a close-object in-focus condition is performed by moving the second lens unit G2 to the object side along the optical axis.

The third lens unit G3 comprises solely a bi-concave ninth lens element L9.

Embodiment 5

As shown in FIG. 10, the first lens unit G1, in order from the object side to the image side, comprises: a negative meniscus first lens element L1 with the convex surface facing the object side; a bi-concave second lens element L2; a bi-convex third lens element L3; a bi-convex fourth lens element L4; a bi-concave fifth lens element L5; an aperture diaphragm A; a bi-concave sixth lens element L6; a positive meniscus seventh lens element L7 with the convex surface facing the object side; and a positive meniscus eighth lens element L8 with the convex surface facing the object side. Among these, the second lens element L2 and the third lens element L3 are cemented with each other, the fourth lens element L4 and the fifth lens element L5 are cemented with each other, and the sixth lens element L6 and the seventh lens element L7 are cemented with each other. Further, by moving the eighth lens element L8 as a single lens element having positive optical power in a direction perpendicular to the optical axis, image point movement caused by vibration of the entire system can be compensated. That is, image blur caused by hand blurring, vibration and the like can be compensated optically.

The second lens unit G2, in order from the object side to the image side, comprises: a bi-concave ninth lens element L9; and a bi-convex tenth lens element L10. Among these, the ninth lens element L9 has an aspheric object side surface. Focusing from an infinity in-focus condition to a close-object in-focus condition is performed by moving the second lens unit G2 to the object side along the optical axis.

The third lens unit G3, in order from the object side to the image side, comprises: a positive meniscus eleventh lens element L11 with the convex surface facing the image side; and a negative meniscus twelfth lens element L12 with the convex surface facing the image side. The eleventh lens element L11 and the twelfth lens element L12 are cemented with each other. The twelfth lens element L12 has an aspheric image side surface.

Embodiment 6

Figure 13:
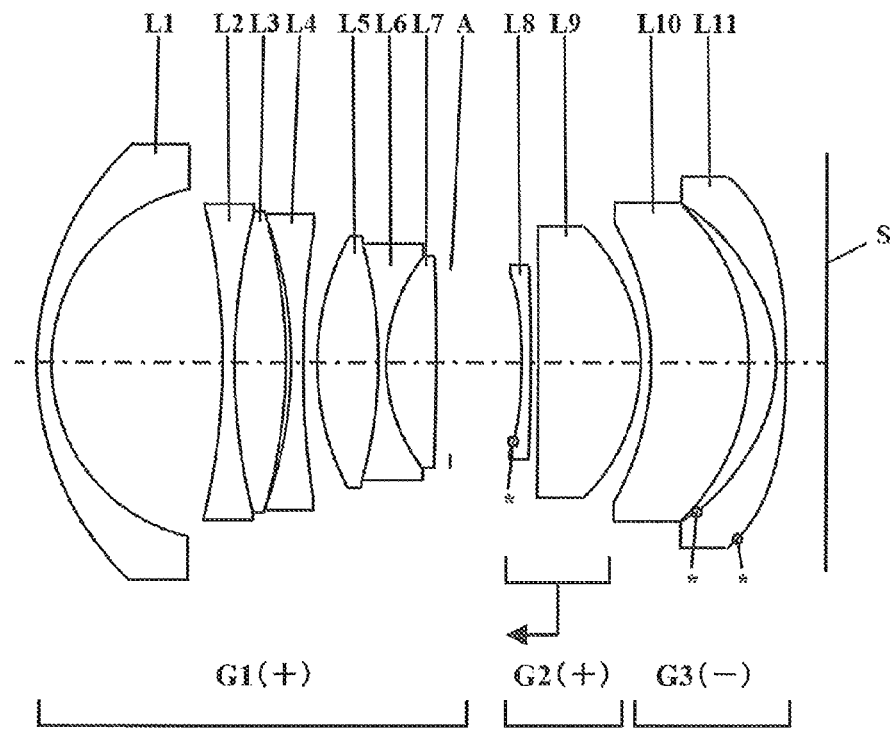
FIG. 13 is a lens arrangement diagram showing an infinity in-focus condition of an inner focus lens system according to Embodiment 6 (Numerical Example 6)
Figure 14:
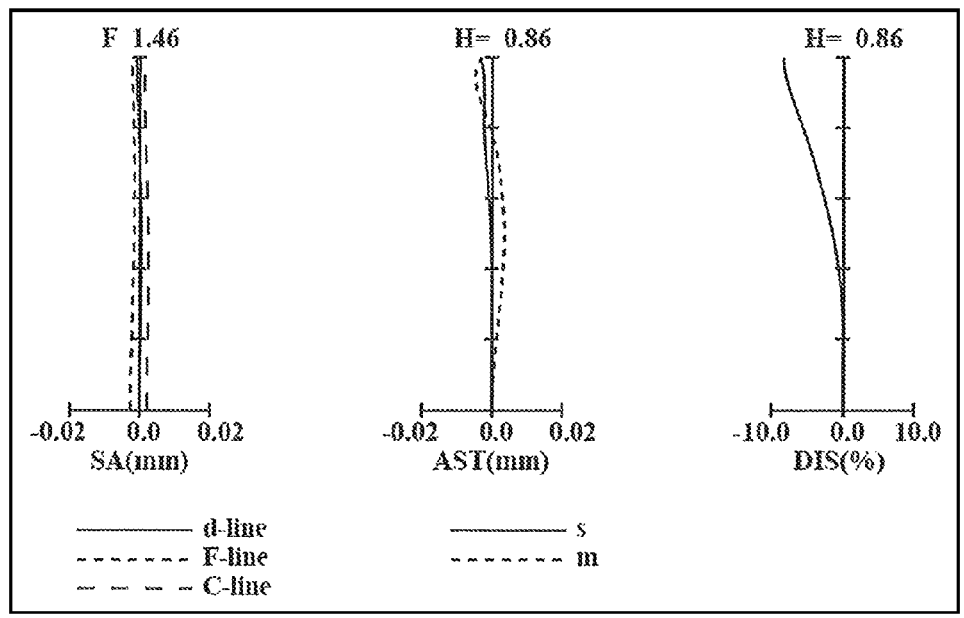
FIG. 14 is a longitudinal aberration diagram of the infinity in-focus condition of the inner focus lens system according to Numerical Example 6.

As shown in FIG. 13, the first lens unit G1, in order from the object side to the image side, comprises: a negative meniscus first lens element L1 with the convex surface facing the object side; a bi-concave second lens element L2; a bi-convex third lens element L3; a bi-concave fourth lens element L4; a bi-convex fifth lens element L5; a bi-concave sixth lens element L6; a bi-convex seventh lens element L7, and an aperture diaphragm A. Among these, the second lens element L2 and the third lens element L3 are cemented with each other, and the fifth lens element L5, the sixth lens element L6, and the seventh lens element L7 are cemented with each other.

The second lens unit G2, in order from the object side to the image side, comprises: a negative meniscus eighth lens element L8 with the convex surface facing the image side; and a positive meniscus ninth lens element L9 with the convex surface facing the image side. Among these, the eighth lens element L8 has an aspheric object side surface. Focusing from an infinity in-focus condition to a close-object in-focus condition is performed by moving the second lens unit G2 to the object side along the optical axis.

The third lens unit G3, in order from the object side to the image side, comprises: a positive meniscus tenth lens element L10 with the convex surface facing the image side; and a negative meniscus eleventh lens element L11 with the convex surface facing the image side. Among these, the eleventh lens element L11 has two aspheric surfaces.

Embodiment 7

Figure 15:
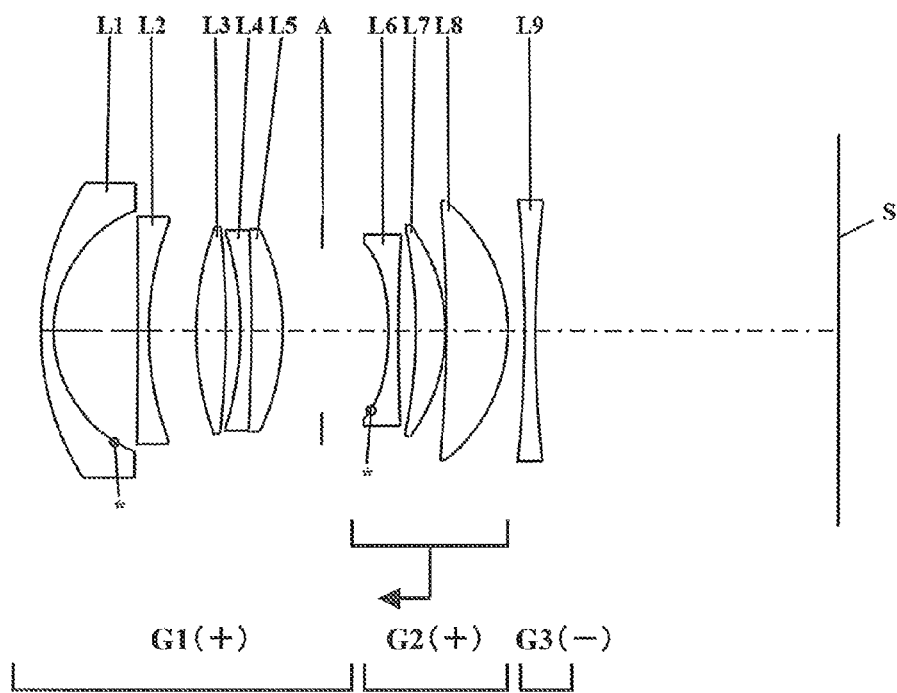
FIG. 15 is a lens arrangement diagram showing an infinity in-focus condition of an inner focus lens system according to Embodiment 7 (Numerical Example 7)
Figure 16:
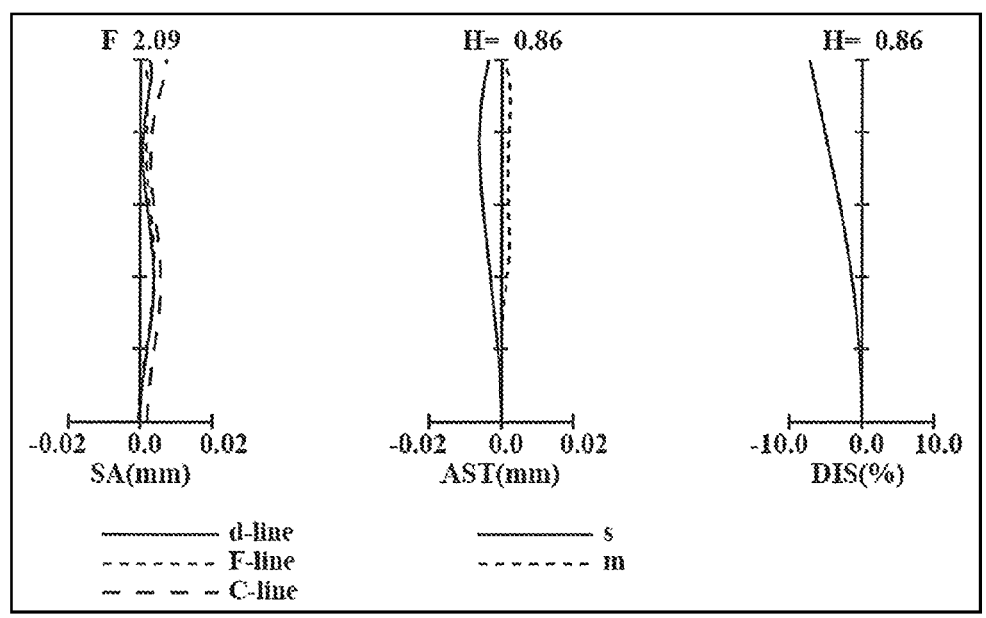
FIG. 16 is a longitudinal aberration diagram of the infinity in-focus condition of the inner focus lens system according to Numerical Example 7.

As shown in FIG. 15, the first lens unit G1, in order from the object side to the image side, comprises: a negative meniscus first lens element L1 with the convex surface facing the object side; a bi-concave second lens element L2; a bi-convex third lens element L3; a negative meniscus fourth lens element L4 with the convex surface facing the image side; a positive meniscus fifth lens element L5 with the convex surface facing the image side; and an aperture diaphragm A. Among these, the fourth lens element L4 and the fifth lens element L5 are cemented with each other. Further, the first lens element L1 has an aspheric image side surface.

The second lens unit G2, in order from the object side to the image side, comprises: a bi-concave sixth lens element L6; a positive meniscus seventh lens element L7 with the convex surface facing the image side; and a positive meniscus eighth lens element L8 with the convex surface facing the image side. Among these, the sixth lens element L6 has an aspheric object side surface. Focusing from an infinity in-focus condition to a close-object in-focus condition is performed by moving the second lens unit G2 to the object side along the optical axis.

The third lens unit G3 comprises solely a bi-concave ninth lens element L9.

Embodiment 8

Figure 17:
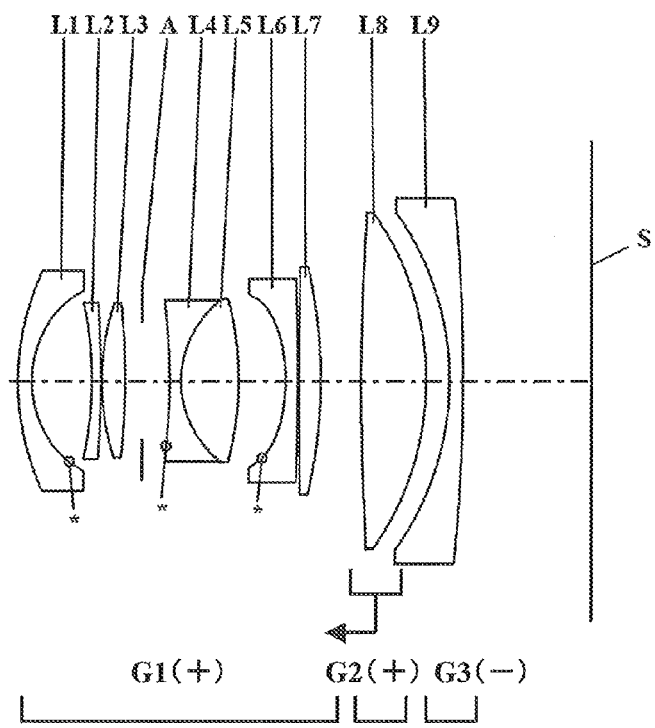
FIG. 17 is a lens arrangement diagram showing an infinity in-focus condition of an inner focus lens system according to Embodiment 8 (Numerical Example 8)
Figure 18:
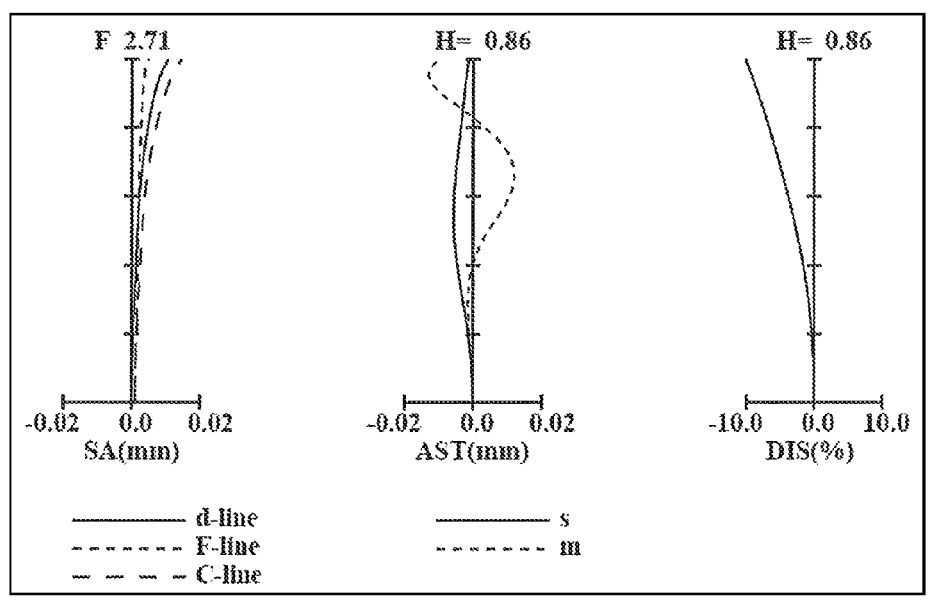
FIG. 18 is a longitudinal aberration diagram of the infinity in-focus condition of the inner focus lens system according to Numerical Example 8.

As shown in FIG. 17, the first lens unit G1, in order from the object side to the image side, comprises: a negative meniscus first lens element L1 with the convex surface facing the object side; a negative meniscus second lens element L2 with the convex surface facing the image side; a bi-convex third lens element L3; an aperture diaphragm A; a bi-concave fourth lens element L4; a bi-convex fifth lens element L5; a negative meniscus sixth lens element L6 with the convex surface facing the image side; and a bi-convex seventh lens element L7. Among these, the fourth lens element L4 and the fifth lens element L5 are cemented with each other. Further, the first lens element L1 has an aspheric image side surface, the fourth lens element L4 has an aspheric object side surface, and the sixth lens element L6 has an aspheric object side surface.

The second lens unit G2 comprises solely a bi-convex eighth lens element L8. Focusing from an infinity in-focus condition to a close-object in-focus condition is performed by moving the second lens unit G2 to the object side along the optical axis.

The third lens unit G3 comprises solely a negative meniscus ninth lens element L9 with the convex surface facing the image side.

Embodiment 9

Figure 19:
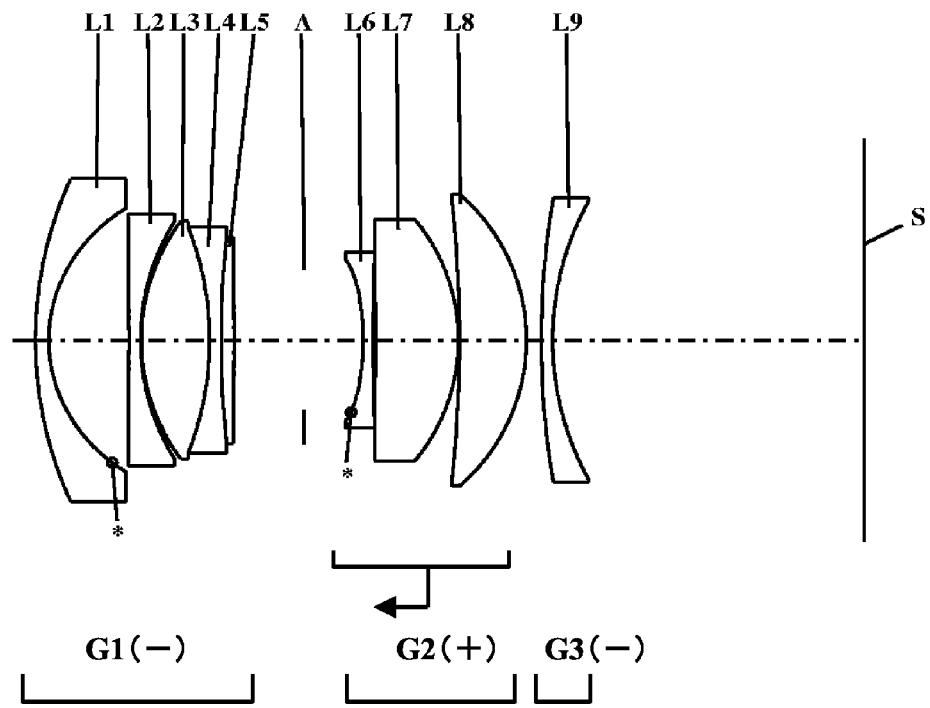
FIG. 19 is a lens arrangement diagram showing an infinity in-focus condition of an inner focus lens system according to Embodiment 9 (Numerical Example 9)
Figure 20:
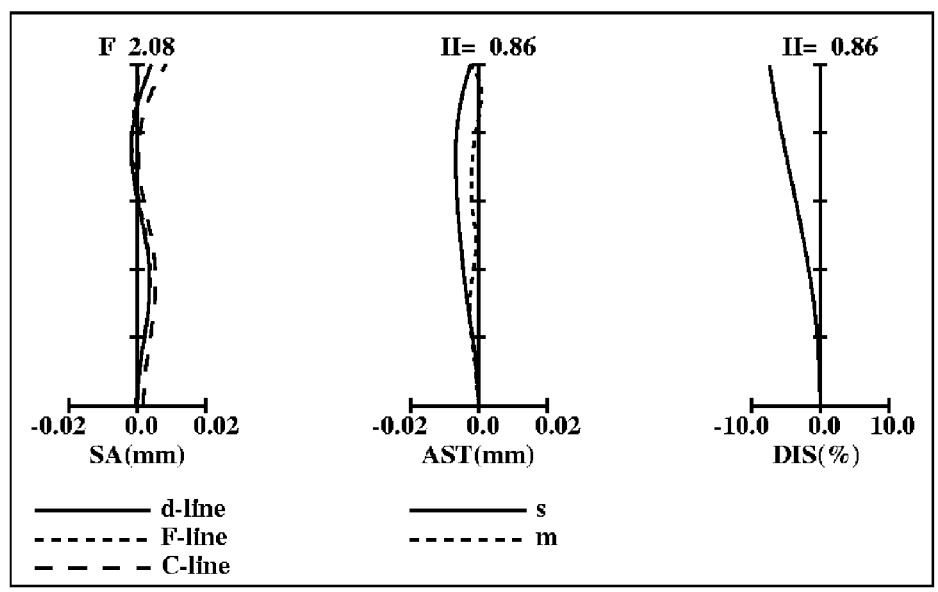
FIG. 20 is a longitudinal aberration diagram of the infinity in-focus condition of the inner focus lens system according to Numerical Example 9.

As shown in FIG. 19, the first lens unit G1, in order from the object side to the image side, comprises: a negative meniscus first lens element L1 with the convex surface facing the object side; a bi-concave second lens element L2; a bi-convex third lens element L3; a bi-concave fourth lens element L4; a bi-convex fifth lens element L5; and an aperture diaphragm A. Among these, the third lens element L3, the fourth lens element L4, and the fifth lens element L5 are cemented with each other. Further, the first lens element L1 has an aspheric image side surface.

The second lens unit G2, in order from the object side to the image side, comprises: a bi-concave sixth lens element L6; a positive meniscus seventh lens element L7 with the convex surface facing the image side; and a positive meniscus eighth lens element L8 with the convex surface facing the image side. Among these, the sixth lens element L6 has an aspheric object side surface. Focusing from an infinity in-focus condition to a close-object in-focus condition is performed by moving the second lens unit G2 to the object side along the optical axis.

The third lens unit G3 comprises solely a negative meniscus ninth lens element L9 with the convex surface facing the object side.

Each of the inner focus lens systems according to Embodiments 1 to 9, in order from the object side to the image side, comprises: the first lens unit G1 including the first lens element L1 that is located closest to the object side and has negative optical power; the second lens unit G2 having positive optical power; and the third lens unit G3 having negative optical power, and is provided with the aperture diaphragm A. The first lens unit G1, the third lens unit G3, and the aperture diaphragm A are fixed with respect to the image surface S in focusing from an infinity in-focus condition to a close-object in-focus condition. The second lens unit G2 moves with respect to the image surface S in the focusing (hereinafter, this lens configuration is referred to as a basic configuration of the embodiment).

As described above, in the inner focus lens systems according to Embodiments 1 to 9, the first lens element L1 having negative optical power is located closest to the object side. Thereby, an image side principal point can be brought close to the image surface S. Therefore, size reduction of the optical system can be achieved while performing sufficient compensation of aberrations.

In the inner focus lens systems according to Embodiments 1 to 9, the first lens unit G1, the third lens unit G3, and the aperture diaphragm A are fixed with respect to the image surface S in the focusing. Therefore, the focusing mechanism can be simplified, thereby providing a compact lens barrel, a compact interchangeable lens apparatus, and a compact camera system.

In the inner focus lens systems according to Embodiments 1 to 9, the second lens unit G2 has positive optical power. Therefore, an optical system in which image tremor due to focusing is small is obtained.

In the inner focus lens systems according to Embodiments 1 to 9, the third lens unit G3 has negative optical power. Therefore, curvature of field associated with focusing can be successfully compensated.

As described above, Embodiments 1 to 9 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that an inner focus lens system like the inner focus lens systems according to Embodiments 1 to 9 can satisfy. Here, a plurality of conditions is set forth for the inner focus lens system according to each embodiment. A configuration that satisfies all the plurality of conditions is most effective for the inner focus lens system. However, when an individual condition is satisfied, an inner focus lens system having the corresponding effect is obtained.

For example, an inner focus lens system having the basic configuration like the inner focus lens systems according to Embodiments 1 to 9 satisfies the following conditions (1) and (2):

$$BF/Y < 1.7 \quad (1)$$

$$TH/f > 1.6 \quad (2)$$

where
BF is a distance from an apex of an image side surface of a lens element located closest to the image side in the lens system, to the image surface,
Y is a maximum image height,
TH is a distance from an apex of an object side surface of a lens element located closest to the object side in the lens system, to the apex of the image side surface of the lens element located closest to the image side in the lens system, and
f is the focal length of the lens system in an infinity in-focus condition.

The condition (1) sets forth the ratio between the back focal length of the lens system and the maximum image height. When the value exceeds the upper limit of the condition (1), the back focal length is lengthened, which makes it difficult to achieve size reduction of the lens system.

When the following condition (1)' is satisfied, the above-mentioned effect is achieved more successfully.

$$BF/Y < 1.65 \quad (1)'$$

The condition (2) sets forth the ratio between the distance from the object side surface of the lens element located closest to the object side to the object side surface of the lens element located closest to the image side, and the focal length of the lens system in the infinity in-focus condition. When the value goes below the lower limit of the condition (2), it becomes difficult to compensate spherical aberration and astigmatism which are associated with increased aperture.

When the following condition (2)' is satisfied, the above-mentioned effect is achieved more successfully.

$$TH/f > 1.65 \quad (2)'$$

It is beneficial that an inner focus lens system having the basic configuration like the inner focus lens systems according to Embodiments 1 to 9, in which the first lens unit includes the second lens element on the image side relative to the first lens element, satisfies the following condition (3):

$$0 < |(r_{2a} + r_{1b})/(r_{2a} - r_{1b})| < 1 \quad (3)$$

where
$r_{1b}$ is a radius of curvature of the image side surface of the first lens element, and
$r_{2a}$ is a radius of curvature of the object side surface of the second lens element.

The condition (3) relates to the shape of an air lens formed between the first lens element and the second lens element. When the value exceeds the upper limit of the condition (3), it becomes difficult to compensate astigmatism associated with increased aperture, and thus it becomes difficult to meet the demand for large aperture.

When the following condition (3)' is satisfied, the above-mentioned effect is achieved more successfully.

$$0 < |(r_{2a} + r_{1b})/(r_{2a} - r_{1b})| < 0.8 \quad (3)'$$

When the following condition (3)″ is satisfied, the above-mentioned effect is achieved still more successfully.

$$0<|(r_{2a}+r_{1b})/(r_{2a}-r_{1b})|<0.6 \quad (3)''$$

It is beneficial that an inner focus lens system having the basic configuration like the inner focus lens systems according to Embodiments 1 to 8 satisfies the following condition (4):

$$-2.5<f_2/f_3<-0.25 \quad (4)$$

where
$f_2$ is a focal length of the second lens unit, and
$f_3$ is a focal length of the third lens unit.

The condition (4) sets forth the ratio between the focal length of the second lens unit and the focal length of the third lens unit. When the value exceeds the upper limit of the condition (4), the optical power of the third lens unit is weakened, which makes it difficult to shorten the back focal length. As a result, it becomes difficult to achieve size reduction of the lens system, and provide a compact lens barrel. When the value goes below the lower limit of the condition (4), the optical power of the second lens unit is raised, which makes it difficult to compensate curvature of field during focusing.

When at least one of the following conditions (4-1)′ and (4-2)′ is satisfied, the above-mentioned effect is achieved more successfully.

$$-1.3<f_2/f_3 \quad (4-1)'$$

$$f_2/f_3<-0.35 \quad (4-2)'$$

When at least one of the following conditions (4-1)″ and (4-2)″ is satisfied, the above-mentioned effect is achieved still more successfully.

$$-0.9<f_2/f_3 \quad (4-1)''$$

$$f_2/f_3<-0.4 \quad (4-2)''$$

When at least one of the following conditions (4-1)‴ and (4-2)‴ is satisfied, the above-mentioned effect is achieved particularly successfully.

$$-0.7<f_2/f_3 \quad (4-1)'''$$

$$f_2/f_3<-0.45 \quad (4-2)'''$$

It is beneficial that an inner focus lens system having the basic configuration like the inner focus lens systems according to Embodiments 1 to 9 satisfies the following condition (5):

$$0.23<D_{max}/Y<1.3 \quad (5)$$

where
$D_{max}$ is a maximum value among air spaces between the lens elements constituting the lens system in an infinity in-focus condition, and
Y is the maximum image height.

The condition (5) relates to the maximum air space between the lens elements in the infinity in-focus condition. When the value exceeds the upper limit of the condition (5), it becomes difficult to achieve size reduction of the lens system, and provide a compact lens barrel. When the value goes below the lower limit of the condition (5), it becomes difficult to compensate distortion.

When at least one of the following conditions (5-1)′ and (5-2)′ is satisfied, the above-mentioned effect is achieved more successfully.

$$0.4<D_{max}/Y \quad (5-1)'$$

$$D_{max}/Y<1.1 \quad (5-2)'$$

When at least one of the following conditions (5-1)″ and (5-2)″ is satisfied, the above-mentioned effect is achieved still more successfully.

$$0.6<D_{max}/Y \quad (5-1)''$$

$$D_{max}/Y<0.9 \quad (5-2)''$$

It is beneficial that an inner focus lens system having the basic configuration like the inner focus lens systems according to Embodiments 1 to 9 satisfies the following condition (6):

$$nd_p>1.79 \quad (6)$$

where
$nd_p$ is a refractive index to the d-line of a lens element located closest to the object side in the lens system, among the lens elements having positive optical power.

The condition (6) sets forth the refractive index of the lens element located closest to the object side in the lens system, among the lens elements having positive optical power. When the value goes below the lower limit of the condition (6), the radius of curvature of the lens element located closest to the object side and having positive optical power is reduced, which makes it difficult to compensate curvature of field that occurs in the first lens element.

When the following condition (6)′ is satisfied, the above-mentioned effect is achieved more successfully.

$$nd_p>1.9 \quad (6)'$$

It is beneficial that an inner focus lens system having the basic configuration like the inner focus lens systems according to Embodiments 1 to 9 satisfies the following condition (7):

$$(r_{1b}+r_{1a})/(r_{1b}-r_{1a})<-1 \quad (7)$$

where
$r_{1a}$ is a radius of curvature of an object side surface of the first lens element, and
$r_{1b}$ is the radius of curvature of the image side surface of the first lens element.

The condition (7) relates to the shape of the first lens element. When the value exceeds the upper limit of the condition (7), it becomes difficult to compensate distortion.

When the following condition (7)′ is satisfied, the above-mentioned effect is achieved more successfully.

$$(r_{1b}+r_{1a})/(r_{1b}-r_{1a})<-1.6 \quad (7)'$$

It is beneficial that an inner focus lens system having the basic configuration like the inner focus lens systems according to Embodiments 1 to 9 satisfies the following condition (8):

$$|f_1/f|<3.0 \quad (8)$$

where
$f_1$ is a focal length of the first lens unit, and
f is the focal length of the lens system in an infinity in-focus condition.

The condition (8) sets forth the ratio between the focal length of the first lens unit and the focal length of the lens system. When the value exceeds the upper limit of the condition (8), the optical power of the first lens unit is weakened, which makes it difficult to achieve size reduction of the lens system.

When the following condition (8)′ is satisfied, the above-mentioned effect is achieved more successfully.

$$|f_1/f|<2.0 \quad (8)'$$

When the following condition (8)″ is satisfied, the above-mentioned effect is achieved still more successfully.

$$|f_1/f|<1.6 \quad (8)''$$

It is beneficial that an inner focus lens system having the basic configuration like the inner focus lens systems according to Embodiments 1 to 9, in which the first lens unit includes the second lens element located on the image side relative to the first lens element, satisfies the following condition (9):

$$vd_{12}>60 \quad (9)$$

where $vd_{12}$ is a larger value between an Abbe number to the d-line of the first lens element and an Abbe number to the d-line of the second lens element.

The condition (9) sets forth the larger value between the Abbe number to the d-line of the first lens element and the Abbe number to the d-line of the second lens element. When the value goes below the lower limit of the condition (9), it becomes difficult to compensate magnification chromatic aberration that occurs in the first lens unit.

When the following condition (9)′ is satisfied, the above-mentioned effect is achieved more successfully.

$$vd_{12}>70 \quad (9)'$$

It is beneficial that an inner focus lens system having the basic configuration like the inner focus lens systems according to Embodiments 1 to 9 satisfies the following condition (10):

$$0.4<Ts/L<0.8 \quad (10)$$

where

Ts is an axial distance from the aperture diaphragm to the image surface, and

L is an overall length of lens system (an axial distance from an object side surface of the first lens element to the image surface).

The condition (10) sets forth the ratio between the axial distance from the aperture diaphragm to the image surface, and the overall length of lens system. When the value goes below the lower limit of the condition (10), the distance between the exit pupil and the image surface is reduced, which makes it difficult to achieve sufficient light-converging efficiency to the image surface when this lens system is applied to a camera having an image sensor. When the value exceeds the upper limit of the condition (10), each of lens elements located on the image side relative to the aperture diaphragm is enlarged, which makes it difficult to achieve a compact lens system.

When at least one of the following conditions (10-1)′ and (10-2)′ is satisfied, the above-mentioned effect is achieved more successfully.

$$0.45<Ts/L \quad (10\text{-}1)'$$

$$Ts/L<0.65 \quad (10\text{-}2)'$$

In an inner focus lens system having the basic configuration like the inner focus lens systems according to Embodiments 1 to 9, it is beneficial that the aperture diaphragm is located on the object side relative to the second lens unit. When the aperture diaphragm is not located on the object side relative to the second lens unit, the distance between the exit pupil and the image surface is reduced, which makes it difficult to achieve sufficient light-converging efficiency to the image surface when this lens system is applied to a camera having an image sensor.

In an inner focus lens system having the basic configuration like the inner focus lens systems according to Embodiments 2 to 4 and 6, it is beneficial that a lens element located closest to the object side in the second lens unit is a lens element having a convex surface facing the image side, and having negative optical power. When the lens element located closest to the object side in the second lens unit is a lens element having a convex surface facing the image side and having negative optical power, curvature of field associated with focusing is compensated more sufficiently.

In an inner focus lens system having the basic configuration like the inner focus lens systems according to Embodiments 1 to 9, it is beneficial that a lens element located closest to the image side in the third lens unit has negative optical power. When the lens element located closest to the image side in the third lens unit does not have negative optical power, it becomes difficult to compensate curvature of field.

The individual lens units constituting the inner focus lens systems according to Embodiments 1 to 9 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved.

The individual lens elements constituting the inner focus lens systems according to Embodiments 1 to 9 may be lens elements each prepared by cementing a transparent resin layer made of ultraviolet-ray curable resin on a surface of a glass lens element. Because the optical power of the transparent resin layer is weak, the glass lens element and the transparent resin layer are totally counted as one lens element. In the same manner, when a lens element that is similar to a plane plate is located, the lens element that is similar to a plane plate is not counted as one lens element because the optical power of the lens element that is similar to a plane plate is weak.

Embodiment 10

Figure 21:
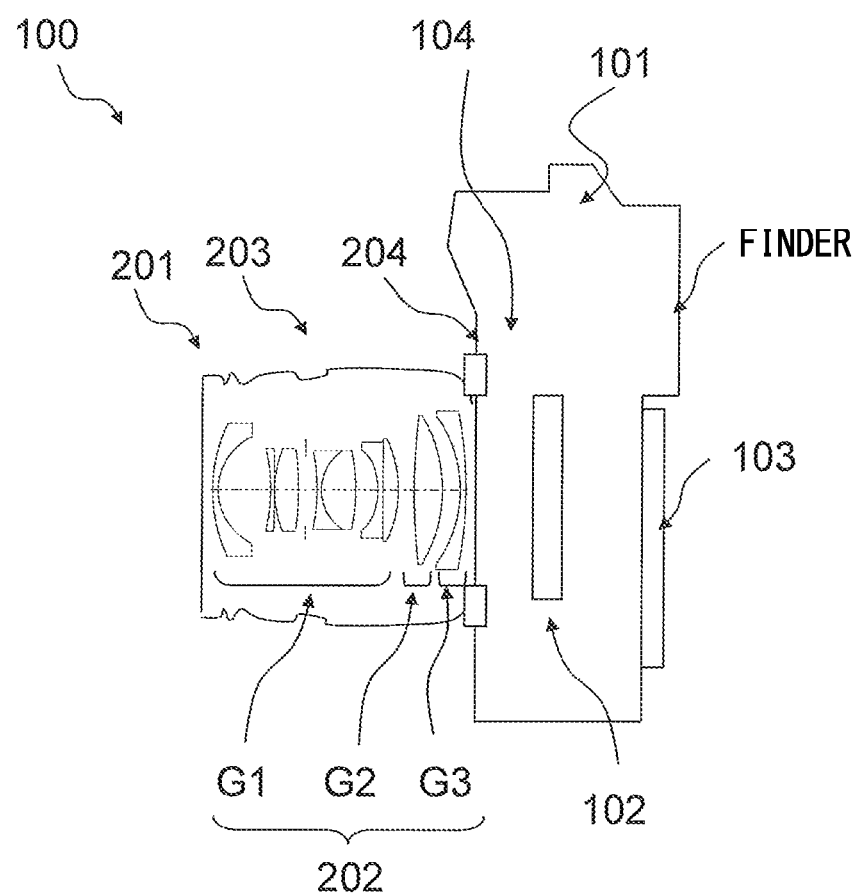
FIG. 21 is a schematic construction diagram of an interchangeable-lens type digital camera system according to Embodiment 10.

FIG. 21 is a schematic construction diagram of an interchangeable-lens type digital camera system according to Embodiment 10.

The interchangeable-lens type digital camera system 100 according to Embodiment 10 includes a camera body 101, and an interchangeable lens apparatus 201 which is detachably connected to the camera body 101.

The camera body 101 includes: an image sensor 102 which receives an optical image formed by an inner focus lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: an inner focus lens system 202 according to any of Embodiments 1 to 9; a lens barrel 203 which holds the inner focus lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 21, the inner focus lens system according to Embodiment 1 is employed as the inner focus lens system 202.

In Embodiment 10, since the inner focus lens system 202 according to any of Embodiments 1 to 9 is employed, a compact interchangeable lens apparatus having excellent imaging performance can be realized at low cost. Moreover, size reduction and cost reduction of the entire camera system 100 according to Embodiment 10 can be achieved.

In the interchangeable-lens type digital camera system according to Embodiment 10, the inner focus lens systems according to Embodiments 1 to 9 are shown as the inner focus lens system 202, and the entire focusing range need not be used in these inner focus lens systems. That is, in accordance with a desired focusing range, a range where satisfactory optical performance is obtained may exclusively be used.

An imaging device comprising each of the inner focus lens systems according to Embodiments 1 to 9, and an image sensor such as a CCD or a CMOS may be applied to a digital still camera, a digital video camera, a camera for a mobile terminal device such as a smart-phone, a surveillance camera in a surveillance system, a Web camera, a vehicle-mounted camera or the like.

As described above, Embodiment 10 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the inner focus lens systems according to Embodiments 1 to 9 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is an n-th order aspherical coefficient.

FIGS. 2, 4, 6, 9, 11, 14, 16, 18, and 20 are longitudinal aberration diagrams of an infinity in-focus condition of the inner focus lens systems according to Numerical Examples 1 to 9, respectively.

Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

Figure 7:
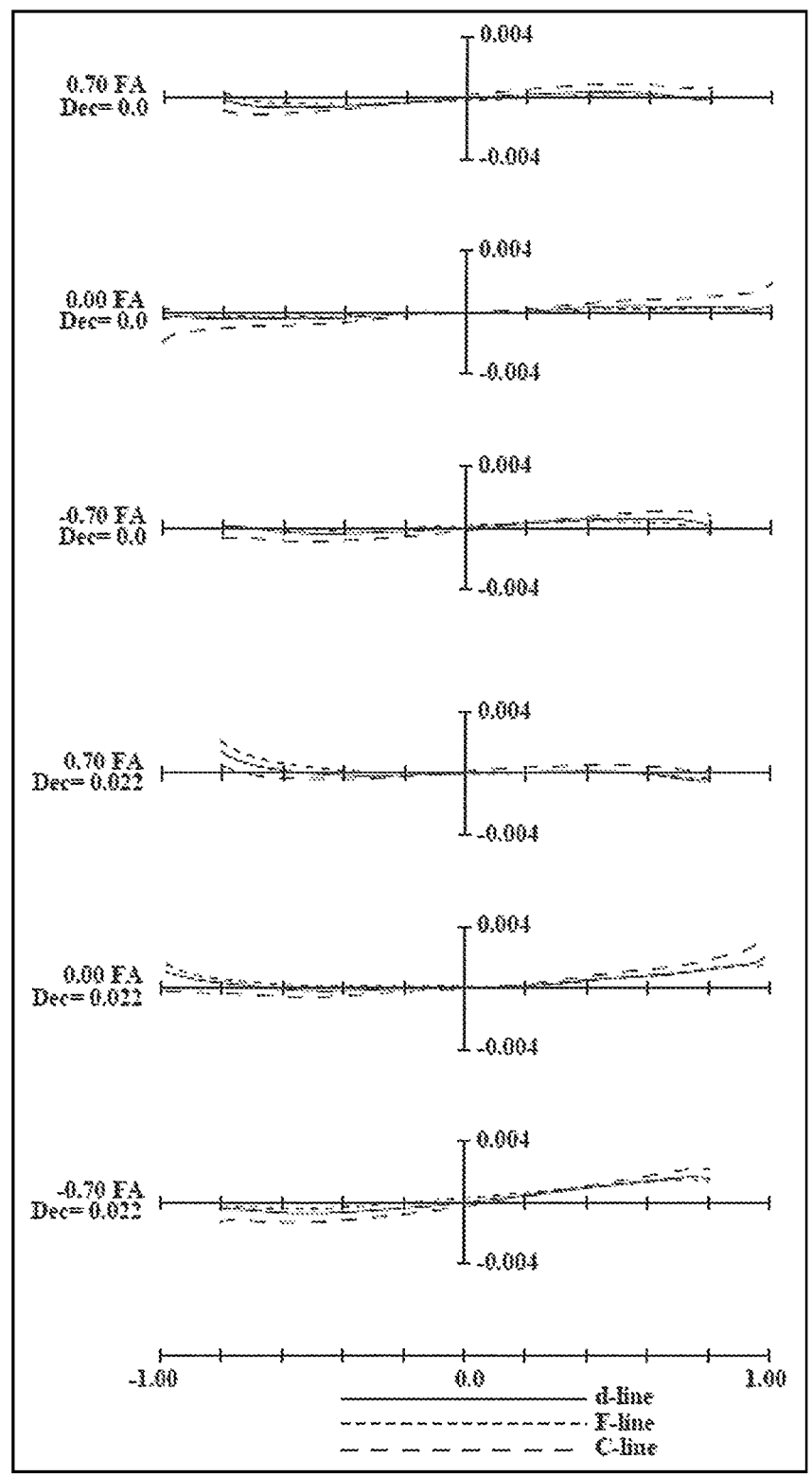
FIG. 7 is a lateral aberration diagram of the infinity in-focus condition of the inner focus lens system according to Numerical Example 3, in a basic state where image blur compensation is not performed and in an image blur compensation state.
Figure 12:
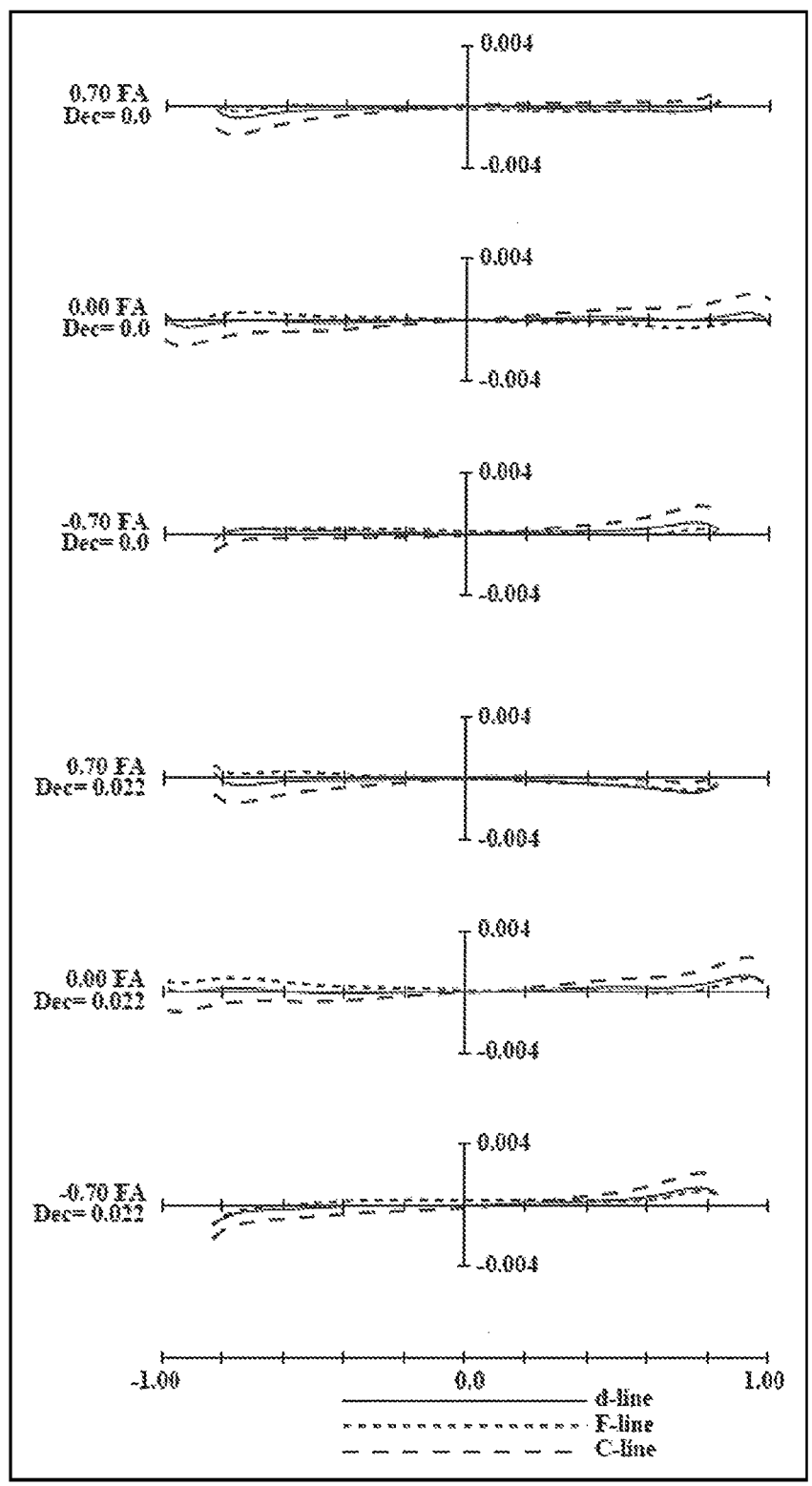
FIG. 12 is a lateral aberration diagram of the infinity in-focus condition of the inner focus lens system according to Numerical Example 5, in a basic state where image blur compensation is not performed and in an image blur compensation state.

FIGS. 7 and 12 are lateral aberration diagrams of an infinity in-focus condition of the inner focus lens systems according to Numerical Examples 3 and 5, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the eighth lens element L8 is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1, the optical axis of the second lens unit G2, and the optical axis of the third lens unit G3.

In the inner focus lens system according to each of Numerical Examples 3 and 5, the amount of movement of the eighth lens element L8 in a direction perpendicular to the optical axis in an image blur compensation state in an infinity in-focus condition is 0.022 mm.

When the shooting distance is infinity, the amount of image decentering in a case that the inner focus lens system inclines by 0.4° is equal to the amount of image decentering in a case that the eighth lens element L8 displaces in parallel by the above-mentioned value in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of an inner focus lens system is the same, the amount of parallel translation required for image blur compensation decreases with decreasing focal length of the entire inner focus lens system. Thus, at arbitrary focus positions, sufficient image blur compensation can be performed for image blur compensation angles up to 0.4° without degrading the imaging characteristics.

Numerical Example 1

The inner focus lens system of Numerical Example 1 corresponds to Embodiment 1 shown in FIG. 1. Table 1 shows the surface data of the inner focus lens system of Numerical Example 1. Table 2 shows the aspherical data. Table 3 shows the various data. Table 4 shows the lens unit data.

TABLE 1

(Surface data)

| Surface number | r | d | nd | vd |
|---|---|---|---|---|
| Object surface | ∞ | | | |
| 1 | 1.42770 | 0.05150 | 1.52500 | 70.3 |
| 2* | 0.54510 | 0.49150 | | |
| 3 | −1.62210 | 0.03440 | 1.56732 | 42.8 |
| 4 | −19.34100 | 0.00430 | | |
| 5 | 1.01280 | 0.22550 | 1.80420 | 46.5 |
| 6 | −2.88650 | 0.06440 | | |
| 7(Diaphragm) | ∞ | 0.10740 | | |
| 8* | −1.95140 | 0.04300 | 1.68400 | 31.3 |
| 9 | 0.44210 | 0.31650 | 1.91082 | 35.2 |
| 10 | −1.73190 | 0.20620 | | |
| 11* | −0.70260 | 0.04730 | 2.00178 | 19.3 |
| 12 | 71.04730 | 0.14110 | 1.80420 | 46.5 |
| 13 | −1.09670 | 0.14950 | | |
| 14 | 5.89790 | 0.25770 | 2.00069 | 25.5 |
| 15 | −1.35350 | 0.16780 | | |
| 16 | −1.15870 | 0.05150 | 1.80518 | 25.5 |
| 17 | −3.80540 | (BF) | | |
| Image surface | ∞ | | | |

TABLE 2

(Aspherical data)

Surface No. 2

K = 0.00000E+00, A4 = 2.76459E−04,
A6 = 3.09254E−01, A8 = −3.54627E+00
A10 = 1.26107E+01, A12 = 1.74223E+00

Surface No. 8

K = 0.00000E+00, A4 = −2.66915E−01,
A6 = 2.45018E+00, A8 = −4.57864E+01
A10 = 3.24551E+02, A12 = −1.16477E+03

Surface No. 11

K = 0.00000E+00, A4 = −1.07541E+00,
A6 = 6.37889E+00, A8 = −2.05439E+02
A10 = 1.82080E+03, A12 = −8.12350E+03

TABLE 3

(Various data)

| Focal length | 1.0000 |
|---|---|
| F-number | 2.08529 |
| Half view angle | 43.7315 |
| Image height | 0.8590 |
| Overall length of lens system | 2.8310 |
| BF | 0.47144 |

TABLE 4

(Lens unit data)

| Lens unit | Initial surface No. | Focal length |
|---|---|---|
| 1 | 1 | 1.70077 |
| 2 | 14 | 1.12001 |
| 3 | 16 | −2.08717 |

Numerical Example 2

The inner focus lens system of Numerical Example 2 corresponds to Embodiment 2 shown in FIG. 3. Table 5 shows the surface data of the inner focus lens system of Numerical Example 2. Table 6 shows the aspherical data. Table 7 shows the various data. Table 8 shows the lens unit data.

TABLE 5

(Surface data)

| Surface number | r | d | nd | vd |
|---|---|---|---|---|
| Object surface | ∞ | | | |
| 1 | 1.88290 | 0.06010 | 1.48749 | 70.4 |
| 2 | 0.54750 | 0.43040 | | |
| 3* | −3.70390 | 0.05150 | 1.65800 | 36.9 |
| 4 | 1.96090 | 0.03840 | | |
| 5 | 1.22570 | 0.14320 | 2.00100 | 29.1 |
| 6 | −3.96270 | 0.07930 | | |
| 7 | −1.66720 | 0.05150 | 1.72825 | 28.3 |
| 8 | 0.66220 | 0.23770 | 1.80420 | 46.5 |
| 9 | −1.18060 | 0.06440 | | |
| 10(Diaphragm) | ∞ | 0.30810 | | |
| 11* | −0.97810 | 0.04730 | 1.88661 | 35.0 |
| 12 | −8.73330 | 0.05630 | | |
| 13 | −1.61070 | 0.10660 | 1.80420 | 46.5 |
| 14 | −0.76180 | 0.00430 | | |
| 15 | −4.48530 | 0.25770 | 1.72916 | 54.7 |
| 16 | −0.67640 | 0.06440 | | |
| 17 | −1.94800 | 0.05150 | 1.75211 | 25.0 |
| 18 | 7.92070 | (BF) | | |
| Image surface | ∞ | | | |

TABLE 6

(Aspherical data)

Surface No. 3

K = 0.00000E+00, A4 = −1.45288E−01,
A6 = −2.74546E−02, A8 = −2.30199E+00
A10 = 6.56186E+00, A12 = −2.75505E+01

Surface No. 11

K = 0.00000E+00, A4 = −1.45027E+00,
A6 = 1.69490E−01, A8 = −5.62269E+01
A10 = 3.35282E+02, A12 = −1.59966E+03

TABLE 7

(Various data)

| Focal length | 1.0002 |
|---|---|
| F-number | 2.08222 |
| Half view angle | 43.7120 |
| Image height | 0.8590 |
| Overall length of lens system | 3.0904 |
| BF | 1.03774 |

TABLE 8

(Lens unit data)

| Lens unit | Initial surface No. | Focal length |
|---|---|---|
| 1 | 1 | 1.50141 |
| 2 | 11 | 1.02536 |
| 3 | 17 | −2.07415 |

Numerical Example 3

The inner focus lens system of Numerical Example 3 corresponds to Embodiment 3 shown in FIG. 5. Table 9 shows the surface data of the inner focus lens system of Numerical Example 3. Table 10 shows the aspherical data. Table 11 shows the various data. Table 12 shows the lens unit data.

TABLE 9

(Surface data)

| Surface number | r | d | nd | vd |
|---|---|---|---|---|
| Object surface | ∞ | | | |
| 1 | 2.05600 | 0.06870 | 1.58913 | 61.3 |
| 2 | 0.73690 | 0.69220 | | |
| 3 | −1.69760 | 0.05160 | 1.64769 | 33.8 |
| 4 | 6.01420 | 0.20880 | 2.00100 | 29.1 |
| 5 | −1.48280 | 0.01980 | | |
| 6 | −1.30850 | 0.05160 | 1.59551 | 39.2 |
| 7 | 6.58200 | 0.00430 | | |
| 8 | 1.38450 | 0.31240 | 1.83481 | 42.7 |
| 9 | −1.28220 | 0.04300 | 1.75211 | 25.0 |
| 10 | 0.99470 | 0.21270 | 2.00100 | 29.1 |
| 11 | 50.16270 | 0.12220 | | |
| 12(Diaphragm) | ∞ | 0.08590 | | |
| 13 | 3.18800 | 0.07220 | 1.83481 | 42.7 |
| 14 | 140.52280 | 0.28350 | | |
| 15* | −1.07450 | 0.03870 | 1.82115 | 24.1 |
| 16 | −3.60690 | 0.02430 | | |
| 17 | 16.27940 | 0.27500 | 1.77250 | 49.6 |
| 18 | −0.72670 | 0.04290 | | |
| 19 | −1.24520 | 0.44440 | 1.84666 | 23.8 |
| 20 | −1.44480 | 0.11510 | | |
| 21* | −1.63690 | 0.04300 | 1.82115 | 24.1 |
| 22* | −6.14500 | (BF) | | |
| Image surface | ∞ | | | |

TABLE 10

(Aspherical data)

Surface No. 15

K = 0.00000E+00, A4 = −8.91809E−01,
A6 = 1.27191E+00, A8 = −3.32429E+01
A10 = 1.80817E+02, A12 = −5.18316E+02
Surface No. 21

K = 0.00000E+00, A4 = −1.60275E+00,
A6 = 6.36984E+00, A8 = −2.08901E+01
A10 = 3.46768E+01, A12 = −2.69215E+01
Surface No. 22

K = 0.00000E+00, A4 = −1.44294E+00,
A6 = 5.52201E+00, A8 = −1.57181E+01
A10 = 2.30984E+01, A12 = −1.41666E+01

TABLE 11

(Various data)

| | |
|---|---|
| Focal length | 1.0001 |
| F-number | 1.45663 |
| Half view angle | 43.6782 |
| Image height | 0.8590 |
| Overall length of lens system | 3.6941 |
| BF | 0.48182 |

TABLE 12

(Lens unit data)

| Lens unit | Initial surface No. | Focal length |
|---|---|---|
| 1 | 1 | 1.10158 |
| 2 | 15 | 1.44956 |
| 3 | 19 | −2.35646 |

Numerical Example 4

The inner focus lens system of Numerical Example 4 corresponds to Embodiment 4 shown in FIG. 8. Table 13 shows the surface data of the inner focus lens system of Numerical Example 4. Table 14 shows the aspherical data. Table 15 shows the various data. Table 16 shows the lens unit data.

TABLE 13

(Surface data)

| Surface number | r | d | nd | vd |
|---|---|---|---|---|
| Object surface | ∞ | | | |
| 1 | 1.29160 | 0.06010 | 1.80420 | 46.5 |
| 2 | 0.60340 | 0.40720 | | |
| 3* | −19.32820 | 0.05150 | 1.52500 | 70.3 |
| 4 | 1.63860 | 0.24710 | | |
| 5 | 1.64110 | 0.12790 | 2.00100 | 29.1 |
| 6 | −5.47280 | 0.17050 | | |
| 7 | −1.68130 | 0.05150 | 1.72825 | 28.3 |
| 8 | 0.85730 | 0.25400 | 1.80420 | 46.5 |
| 9 | −1.26490 | 0.07990 | | |
| 10(Diaphragm) | ∞ | 0.31290 | | |
| 11* | −1.16660 | 0.04720 | 1.88661 | 35.0 |
| 12 | −5.65240 | 0.07600 | | |
| 13 | −1.54540 | 0.09760 | 1.80420 | 46.5 |
| 14 | −0.82700 | 0.00430 | | |
| 15 | −4.94860 | 0.25770 | 1.59349 | 67.0 |
| 16 | −0.67960 | 0.06490 | | |
| 17 | −2.19820 | 0.05150 | 1.75211 | 25.0 |
| 18 | 12.12360 | (BF) | | |
| Image surface | ∞ | | | |

TABLE 14

(Aspherical data)

Surface No. 3

K = 0.00000E+00, A4 = 3.02183E−03,
A6 = 1.64274E−01, A8 = −9.88142E−01
A10 = 3.35704E+00, A12 = −4.45227E+00
Surface No. 11

K = 0.00000E+00, A4 = −1.07672E+00,
A6 = 7.93832E−01, A8 = −4.29162E+01
A10 = 2.74610E+02, A12 = −9.74823E+02

TABLE 15

(Various data)

| | |
|---|---|
| Focal length | 1.0000 |
| F-number | 2.08425 |
| Half view angle | 43.7166 |
| Image height | 0.8590 |
| Overall length of lens system | 3.6482 |
| BF | 1.28635 |

TABLE 16

(Lens unit data)

| Lens unit | Initial surface No. | Focal length |
|---|---|---|
| 1 | 1 | 1.62998 |
| 2 | 11 | 1.22188 |
| 3 | 17 | −2.47030 |

Numerical Example 5

The inner focus lens system of Numerical Example 5 corresponds to Embodiment 5 shown in FIG. 10. Table 17 shows the surface data of the inner focus lens system of Numerical Example 5. Table 18 shows the aspherical data. Table 19 shows the various data. Table 20 shows the lens unit data.

TABLE 17

(Surface data)

| Surface number | r | d | nd | vd |
|---|---|---|---|---|
| Object surface | ∞ | | | |
| 1 | 3.47340 | 0.08590 | 1.62041 | 60.3 |
| 2 | 0.93950 | 1.04750 | | |
| 3 | −1.23800 | 0.06870 | 1.84666 | 23.8 |
| 4 | 9.69550 | 0.39830 | 1.95375 | 32.3 |
| 5 | −1.58500 | 0.00430 | | |
| 6 | 1.34180 | 0.55600 | 1.81600 | 46.7 |
| 7 | −1.97230 | 0.05150 | 1.72825 | 28.3 |
| 8 | 47.14330 | 0.07030 | | |
| 9(Diaphragm) | ∞ | 0.17180 | | |
| 10 | −2.65290 | 0.05150 | 1.64769 | 33.8 |
| 11 | 1.39610 | 0.16520 | 2.00100 | 29.1 |
| 12 | 9.83450 | 0.07490 | | |
| 13 | 2.09880 | 0.08810 | 1.80420 | 46.5 |
| 14 | 6.10600 | 0.27040 | | |
| 15* | −2.91410 | 0.03870 | 1.82115 | 24.1 |
| 16 | 4.88750 | 0.09740 | | |
| 17 | 4.75450 | 0.33900 | 1.74330 | 49.2 |
| 18 | −0.87850 | 0.04290 | | |
| 19 | −1.35460 | 0.25620 | 1.48749 | 70.4 |
| 20 | −0.74090 | 0.05150 | 1.82115 | 24.1 |
| 21* | −3.04610 | (BF) | | |
| Image surface | ∞ | | | |

TABLE 18

(Aspherical data)

Surface No. 15

K = 0.00000E+00, A4 = −6.39656E−01,
A6 = 7.24302E−01, A8 = −1.17882E+01
A10 = 5.08219E+01, A12 = −9.65294E+01

Surface No. 21

K = 0.00000E+00, A4 = −9.70337E−03,
A6 = −3.89218E−01, A8 = 1.16112E+00
A10 = −1.65673E+00, A12 = 1.04114E+00

TABLE 19

(Various data)

| | |
|---|---|
| Focal length | 1.0001 |
| F-number | 1.24833 |
| Half view angle | 43.6641 |
| Image height | 0.8590 |
| Overall length of lens system | 4.3816 |
| BF | 0.45147 |

TABLE 20

(Lens unit data)

| Lens unit | Initial surface No. | Focal length |
|---|---|---|
| 1 | 1 | 0.99566 |
| 2 | 15 | 1.54126 |
| 3 | 19 | −1.83332 |

Numerical Example 6

The inner focus lens system of Numerical Example 6 corresponds to Embodiment 6 shown in FIG. 13. Table 21 shows the surface data of the inner focus lens system of Numerical Example 6. Table 22 shows the aspherical data. Table 23 shows the various data. Table 24 shows the lens unit data.

TABLE 21

(Surface data)

| Surface number | r | d | nd | vd |
|---|---|---|---|---|
| Object surface | ∞ | | | |
| 1 | 1.24860 | 0.06010 | 1.58913 | 61.3 |
| 2 | 0.74870 | 0.72860 | | |
| 3 | −2.76070 | 0.05150 | 1.64769 | 33.8 |
| 4 | 2.51870 | 0.21940 | 2.00100 | 29.1 |
| 5 | −2.19620 | 0.02170 | | |
| 6 | −1.78470 | 0.05150 | 1.58144 | 40.9 |
| 7 | 3.70510 | 0.05940 | | |
| 8 | 1.12320 | 0.25700 | 1.91082 | 35.2 |
| 9 | −1.85130 | 0.03440 | 1.78472 | 25.7 |
| 10 | 0.72270 | 0.20850 | 1.81600 | 46.7 |
| 11 | −13.96990 | 0.06440 | | |
| 12(Diaphragm) | ∞ | 0.29870 | | |
| 13* | −2.50380 | 0.03870 | 2.00178 | 19.3 |
| 14 | −9.08710 | 0.03190 | | |
| 15 | −42.28740 | 0.43470 | 1.91082 | 35.2 |
| 16 | −0.79080 | 0.04450 | | |
| 17 | −1.17510 | 0.41740 | 1.54814 | 45.8 |
| 18 | −0.90890 | 0.11320 | | |
| 19* | −0.69650 | 0.04300 | 2.00178 | 19.3 |
| 20* | −4.23650 | (BF) | | |
| Image surface | ∞ | | | |

TABLE 22

(Aspherical data)

Surface No. 13

K = 0.00000E+00, A4 = −8.73195E−01,
A6 = −7.86743E−01, A8 = −6.38964E+00
A10 = −9.61505E+00, A12 = 1.00121E+01

Surface No. 19

K = −4.64708E−01, A4 = −8.89109E−01,
A6 = 5.61149E+00, A8 = −1.17940E+01
A10 = 6.81379E+00, A12 = −2.12358E−01

TABLE 22-continued (Aspherical data)

Surface No. 20

K = 2.57249E+01, A4 = −9.92009E−01,
A6 = 3.12457E+00, A8 = −4.90657E+00
A10 = 1.32791E+00, A12 = 1.74827E+00

TABLE 23

(Various data)

| | |
|---|---|
| Focal length | 1.0002 |
| F-number | 1.45910 |
| Half view angle | 43.1737 |
| Image height | 0.8590 |
| Overall length of lens system | 3.3515 |
| BF | 0.17291 |

TABLE 24

(Lens unit data)

| Lens unit | Initial surface No. | Focal length |
|---|---|---|
| 1 | 1 | 1.24185 |
| 2 | 13 | 1.06174 |
| 3 | 17 | −0.90526 |

Numerical Example 7

The inner focus lens system of Numerical Example 7 corresponds to Embodiment 7 shown in FIG. 15. Table 25 shows the surface data of the inner focus lens system of Numerical Example 7. Table 26 shows the aspherical data. Table 27 shows the various data. Table 28 shows the lens unit data.

TABLE 25

(Surface data)

| Surface number | r | d | nd | vd |
|---|---|---|---|---|
| Object surface | ∞ | | | |
| 1 | 1.26000 | 0.06010 | 1.88202 | 37.2 |
| 2* | 0.59110 | 0.39490 | | |
| 3 | −44.43790 | 0.05150 | 1.48749 | 70.4 |
| 4 | 1.41830 | 0.22050 | | |
| 5 | 1.38040 | 0.13920 | 2.00100 | 29.1 |
| 6 | −4.51390 | 0.06820 | | |
| 7 | −1.52680 | 0.05150 | 1.80518 | 25.5 |
| 8 | −8.19450 | 0.14620 | 1.60311 | 60.7 |
| 9 | −1.08400 | 0.18870 | | |
| 10(Diaphragm) | ∞ | 0.30460 | | |
| 11* | −1.30500 | 0.04730 | 1.82115 | 24.1 |
| 12 | 9.86480 | 0.08290 | | |
| 13 | −2.26190 | 0.13780 | 1.69680 | 55.5 |
| 14 | −0.82060 | 0.00430 | | |
| 15 | −6.53330 | 0.29130 | 1.69680 | 55.5 |
| 16 | −0.75990 | 0.07870 | | |
| 17 | −5.85480 | 0.05150 | 2.00069 | 25.5 |
| 18 | 5.13120 | (BF) | | |
| Image surface | ∞ | | | |

TABLE 26

(Aspherical data)

Surface No. 2

K = 0.00000E+00, A4 = −6.96803E−02,
A6 = 1.06733E−01, A8 = −2.79321E+00
A10 = 1.09438E+01, A12 = −2.32036E+01

TABLE 26-continued (Aspherical data)

Surface No. 11

K = 0.00000E+00, A4 = −1.19748E+00,
A6 = 6.56409E−01, A8 = −3.20657E+01
A10 = 1.69965E+02, A12 = −5.87842E+02

TABLE 27

(Various data)

| | |
|---|---|
| Focal length | 1.0001 |
| F-number | 2.08512 |
| Half view angle | 42.8216 |
| Image height | 0.8590 |
| Overall length of lens system | 3.7366 |
| BF | 1.41738 |

TABLE 28

(Lens unit data)

| Lens unit | Initial surface No. | Focal length |
|---|---|---|
| 1 | 1 | 2.57086 |
| 2 | 11 | 1.09941 |
| 3 | 17 | −2.72630 |

Numerical Example 8

The inner focus lens system of Numerical Example 8 corresponds to Embodiment 8 shown in FIG. 17. Table 29 shows the surface data of the inner focus lens system of Numerical Example 8. Table 30 shows the aspherical data. Table 31 shows the various data. Table 32 shows the lens unit data.

TABLE 29

(Surface data)

| Surface number | r | d | nd | vd |
|---|---|---|---|---|
| Object surface | ∞ | | | |
| 1 | 1.00090 | 0.05150 | 1.52500 | 70.3 |
| 2* | 0.41420 | 0.23000 | | |
| 3 | −1.36300 | 0.03440 | 1.69895 | 30.0 |
| 4 | −3.95790 | 0.00430 | | |
| 5 | 0.94110 | 0.08800 | 1.80420 | 46.5 |
| 6 | −2.68090 | 0.06440 | | |
| 7(Diaphragm) | ∞ | 0.10740 | | |
| 8* | −2.03510 | 0.04290 | 1.68893 | 31.1 |
| 9 | 0.38270 | 0.21970 | 1.91082 | 35.2 |
| 10 | −1.22060 | 0.17970 | | |
| 11* | −0.72530 | 0.04720 | 2.00178 | 19.3 |
| 12 | −11.03210 | 0.00430 | | |
| 13 | 19.11330 | 0.08330 | 1.80420 | 46.5 |
| 14 | −1.92780 | 0.15230 | | |
| 15 | 10.02270 | 0.24610 | 2.00100 | 29.1 |
| 16 | −1.10650 | 0.08890 | | |
| 17 | −1.09250 | 0.05150 | 1.69895 | 30.0 |
| 18 | −7.05750 | (BF) | | |
| Image surface | ∞ | | | |

TABLE 30

(Aspherical data)

Surface No. 2

K = 0.00000E+00, A4 = 5.45151E−02,
A6 = 2.45062E+01, A8 = −4.60967E+02
A10 = 4.77007E+03, A12 = −1.48213E+04

TABLE 30-continued (Aspherical data)

Surface No. 8

K = 0.00000E+00, A4 = 2.73912E−01,
A6 = 7.42251E+00, A8 = −2.36290E+02
A10 = 3.56354E+03, A12 = −2.46044E+04

Surface No. 11

K = 0.00000E+00, A4 = −1.99685E+00,
A6 = 8.49723E+00, A8 = −6.37756E+02
A10 = 8.78338E+03, A12 = −5.93783E+04

TABLE 31

(Various data)

| | |
|---|---|
| Focal length | 0.9998 |
| F-number | 2.70528 |
| Half view angle | 43.7240 |
| Image height | 0.8590 |
| Overall length of lens system | 2.1879 |
| BF | 0.49203 |

TABLE 32

(Lens unit data)

| Lens unit | Initial surface No. | Focal length |
|---|---|---|
| 1 | 1 | 1.56742 |
| 2 | 15 | 1.00663 |
| 3 | 17 | −1.85593 |

Numerical Example 9

The inner focus lens system of Numerical Example 9 corresponds to Embodiment 9 shown in FIG. 19. Table 33 shows the surface data of the inner focus lens system of Numerical Example 9. Table 34 shows the aspherical data. Table 35 shows the various data. Table 36 shows the lens unit data.

TABLE 33

(Surface data)

| Surface number | r | d | nd | vd |
|---|---|---|---|---|
| Object surface | ∞ | | | |
| 1 | 1.74910 | 0.06010 | 1.80139 | 45.4 |
| 2* | 0.65460 | 0.36230 | | |
| 3 | −36.82910 | 0.05150 | 1.58913 | 61.3 |
| 4 | 1.01420 | 0.00430 | | |
| 5 | 0.90050 | 0.30700 | 1.99537 | 28.5 |
| 6 | −1.39630 | 0.05150 | 1.97805 | 20.8 |
| 7 | 4.20450 | 0.05860 | 1.99537 | 29.1 |
| 8 | −29.52010 | 0.31460 | | |
| 9(Diaphragm) | ∞ | 0.26650 | | |
| 10* | −1.43390 | 0.04730 | 1.98775 | 20.7 |
| 11 | 13.01350 | 0.00880 | | |
| 12 | −18.87110 | 0.37460 | 1.76004 | 48.6 |
| 13 | −0.85310 | 0.00430 | | |
| 14 | −5.93660 | 0.30260 | 1.78967 | 47.1 |
| 15 | −0.86920 | 0.06660 | | |
| 16 | 3.77650 | 0.05150 | 1.76108 | 26.0 |
| 17 | 1.30060 | (BF) | | |
| Image surface | ∞ | | | |

TABLE 34

(Aspherical data)

Surface No. 2

K = 0.00000E+00, A4 = −9.55427E−02,
A6 = 3.43777E−01, A8 = −4.45570E+00
A10 = 1.55699E+01, A12 = −2.65335E+01

Surface No. 10

K = 0.00000E+00, A4 = −1.32383E+00,
A6 = 1.84372E+00, A8 = −6.54946E+01
A10 = 4.24955E+02, A12 = −1.62907E+03

TABLE 35

(Various data)

| | |
|---|---|
| Focal length | 0.9999 |
| F-number | 2.08404 |
| Half view angle | 42.8528 |
| Image height | 0.8590 |
| Overall length of lens system | 3.7372 |
| BF | 1.40512 |

TABLE 36

(Lens unit data)

| Lens unit | Initial surface No. | Focal length |
|---|---|---|
| 1 | 1 | −0.023282 |
| 2 | 10 | 1.16789 |
| 3 | 16 | −0.38017 |

The following Table 37 shows the corresponding values to the individual conditions in the inner focus lens systems of each of Numerical Examples.

TABLE 31

(Values corresponding to conditions)

| | Numerical Example | | | | | | | | |
|---|---|---|---|---|---|---|---|---|---|
| Condition | 1 | 2 | 3 | 4 | 5 | 6 | 7 | 8 | 9 |
| (1) BF/Y | 0.49 | 1.09 | 0.50 | 1.35 | 0.47 | 0.18 | 1.53 | 0.51 | 1.64 |
| (2) TH/f | 2.36 | 2.05 | 3.21 | 2.36 | 3.93 | 3.18 | 2.32 | 1.70 | 2.33 |
| (3) $|(r_{2a} + r_{1b})/(r_{2a} - r_{1b})|$ | 0.50 | 0.74 | 0.39 | 0.94 | 0.14 | 0.57 | 0.97 | 0.53 | 0.97 |
| (4) $f_2/f_3$ | −0.54 | −0.49 | −0.62 | −0.49 | −0.84 | −1.17 | −0.40 | −0.54 | −3.07 |
| (5) $D_{max}/Y$ | 0.51 | 0.45 | 0.72 | 0.43 | 1.10 | 0.78 | 0.43 | 0.24 | 0.44 |
| (6) $nd_p$ | 1.80 | 2.00 | 2.00 | 2.00 | 1.95 | 2.00 | 2.00 | 1.80 | 2.00 |

TABLE 31-continued (Values corresponding to conditions)

| Condition | Numerical Example | | | | | | | | |
|---|---|---|---|---|---|---|---|---|---|
| | 1 | 2 | 3 | 4 | 5 | 6 | 7 | 8 | 9 |
| (7) $(r_{1b}+r_{1a})/(r_{1b}-r_{1a})$ | −2.24 | −1.82 | −2.12 | −2.75 | −1.74 | −4.00 | −2.77 | −2.41 | −2.20 |
| (8) $|f_1/f|$ | 1.70 | 1.50 | 1.10 | 1.63 | 1.00 | 1.24 | 2.57 | 1.57 | 0.02 |
| (9) $vd_{12}$ | 70.3 | 70.4 | 61.3 | 70.3 | 60.3 | 61.3 | 70.4 | 70.3 | 61.3 |
| (10) Ts/L | 0.69 | 0.63 | 0.52 | 0.60 | 0.48 | 0.48 | 0.65 | 0.78 | 0.68 |

The present disclosure is applicable to a digital still camera, a digital video camera, a camera for a mobile terminal device such as a smart-phone, a surveillance camera in a surveillance system, a Web camera, a vehicle-mounted camera or the like. In particular, the present disclosure is applicable to a photographing optical system where high image quality is required like in a digital still camera system or a digital video camera system.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof

What is claimed is:

1. An inner focus lens system having a plurality of lens units each being composed of at least one lens element, the inner focus lens system, in order from an object side to an image side, comprising:
a first lens unit including a first lens element that is located closest to the object side, and has negative optical power;
a second lens unit having positive optical power; and
a third lens unit having negative optical power, wherein
an aperture diaphragm is provided,
the first lens unit, the third lens unit, and the aperture diaphragm are fixed with respect to an image surface in focusing from an infinity in-focus condition to a close-object in-focus condition,
the second lens unit moves with respect to the image surface in the focusing, and
the following conditions (1) and (2) are satisfied:

$$BF/Y<1.7 \quad (1)$$

$$TH/f>1.6 \quad (2)$$

where
BF is a distance from an apex of an image side surface of a lens element located closest to the image side in the lens system, to the image surface,
Y is a maximum image height,
TH is a distance from an apex of an object side surface of a lens element located closest to the object side in the lens system, to the apex of the image side surface of the lens element located closest to the image side in the lens system, and
f is a focal length of the lens system in an infinity in-focus condition.

2. The inner focus lens system as claimed in claim 1, wherein
the first lens unit includes a second lens element on the image side relative to the first lens element, and
the following condition (3) is satisfied:

$$0<|(r_{2a}+r_{1b})/(r_{2a}-r_{1b})|<1 \quad (3)$$

where
$r_{1b}$ is a radius of curvature of an image side surface of the first lens element, and
$r_{2a}$ is a radius of curvature of an object side surface of the second lens element.

3. The inner focus lens system as claimed in claim 1, wherein the following condition (4) is satisfied:

$$-2.5<f_2/f_3<-0.25 \quad (4)$$

where
$f_2$ is a focal length of the second lens unit, and
$f_3$ is a focal length of the third lens unit.

4. The inner focus lens system as claimed in claim 1, wherein the following condition (5) is satisfied:

$$0.23<D_{max}/Y<1.3 \quad (5)$$

where
$D_{max}$ is a maximum value among air spaces between the lens elements constituting the lens system in an infinity in-focus condition, and
Y is the maximum image height.

5. The inner focus lens system as claimed in claim 1, wherein the following condition (6) is satisfied:

$$nd_p>1.79 \quad (6)$$

where
$nd_p$ is a refractive index to the d-line of a lens element located closest to the object side in the lens system, among lens elements having positive optical power.

6. The inner focus lens system as claimed in claim 1, wherein the following condition (7) is satisfied:

$$(r_{1b}+r_{1a})/(r_{1b}-r_{1a})<-1 \quad (7)$$

where
$r_{1a}$ is a radius of curvature of an object side surface of the first lens element, and
$r_{1b}$ is a radius of curvature of an image side surface of the first lens element.

7. The inner focus lens system as claimed in claim 1, wherein the following condition (8) is satisfied:

$$|f_1/f|<3.0 \quad (8)$$

where
$f_1$ is a focal length of the first lens unit, and
f is the focal length of the lens system in an infinity in-focus condition.

8. The inner focus lens system as claimed in claim 1, wherein
the first lens unit includes a second lens element on the image side relative to the first lens element, and
the following condition (9) is satisfied:

$$vd_{12} > 60 \tag{9}$$

where
$vd_{12}$ is a larger value between an Abbe number to the d-line of the first lens element and an Abbe number to the d-line of the second lens element.

9. The inner focus lens system as claimed in claim 1, wherein the following condition (10) is satisfied:

$$0.4 < Ts/L < 0.8 \tag{10}$$

where
Ts is an axial distance from the aperture diaphragm to the image surface, and
L is an overall length of lens system (an axial distance from an object side surface of the first lens element to the image surface).

10. The inner focus lens system as claimed in claim 1, wherein
the aperture diaphragm is located on the object side relative to the second lens unit.

11. The inner focus lens system as claimed in claim 1, wherein
a lens element located closest to the object side in the second lens unit is a lens element that has a convex surface facing the image side, and has negative optical power.

12. The inner focus lens system as claimed in claim 1, wherein
a lens element located closest to the image side in the third lens unit has negative optical power.

13. An interchangeable lens apparatus comprising:
an inner focus lens system as claimed in claim 1; and
a lens mount section which is connectable to a camera body including an image sensor for receiving an optical image formed by the inner focus lens system and converting the optical image into an electric image signal.

14. A camera system comprising:
an interchangeable lens apparatus including an inner focus lens system as claimed in claim 1; and
a camera body which is detachably connected to the interchangeable lens apparatus via a camera mount section, and includes an image sensor for receiving an optical image formed by the inner focus lens system and converting the optical image into an electric image signal.

* * * * *